United States Patent [19]
DeRose et al.

[11] Patent Number: 6,101,511
[45] Date of Patent: *Aug. 8, 2000

[54] DATA PROCESSING SYSTEM AND METHOD FOR GENERATING A REPRESENTATION FOR AND RANDOM ACCESS RENDERING OF ELECTRONIC DOCUMENTS

[75] Inventors: Steven DeRose, Seekonk, Mass.; Jeffrey Vogel, Providence, R.I.

[73] Assignee: Enigma Information Systems Ltd., Bnei Brak, Israel

[ * ] Notice: This patent is subject to a terminal disclaimer.

[21] Appl. No.: 09/352,588

[22] Filed: Jul. 13, 1999

Related U.S. Application Data

[62] Division of application No. 08/885,578, Jun. 30, 1997, Pat. No. 5,983,248, which is a continuation of application No. 08/480,611, Jun. 7, 1995, Pat. No. 5,644,776, which is a division of application No. 08/419,051, Apr. 7, 1995, Pat. No. 5,557,722, which is a continuation of application No. 07/733,204, Jul. 19, 1991, abandoned.

[51] Int. Cl.[7] .................................................... G06F 17/21

[52] U.S. Cl. .................. 707/514; 707/513; 707/531; 707/907

[58] Field of Search ............................... 707/3, 100, 104, 707/513, 514, 531, 907

[56] References Cited

U.S. PATENT DOCUMENTS

| | | | |
|---|---|---|---|
| 4,587,633 | 5/1986 | Wang et al. | 364/900 |
| 4,594,674 | 6/1986 | Boulia et al. | 364/523 |
| 4,608,664 | 8/1986 | Bartlett et al. | 364/900 |
| 4,710,885 | 12/1987 | Litteken | 364/518 |
| 4,716,404 | 12/1987 | Tabata et al. | 340/723 |
| 4,803,643 | 2/1989 | Hickey | 364/523 |
| 4,823,303 | 4/1989 | Terasawa | 364/521 |
| 4,876,665 | 10/1989 | Iwai et al. | 364/900 |
| 4,912,669 | 3/1990 | Iwamoto et al. | 364/900 |

(List continued on next page.)

OTHER PUBLICATIONS

"HTML to the Max: A manifesto for Adding SGML Intelligence to the World–Wide Web". Sperburg–McQueen et al., http://www.ncsa.uiuc.edu/SDG/IT94/Proceedings/Autools/sperburg–mcqueen/sperburg.html.

Bishop et al., "Xpress Yourself," MacUSer, v.8, n.11, p. B17(9), Nov. 1992.

"EBT announces plans to support important new publishing standard: DSSSL", http://www.sil.org/SGML/ebt DSSL.html.

(List continued on next page.)

Primary Examiner—Jean R. Homere
Attorney, Agent, or Firm—Brown Raysman Millstein Felder & Steiner LLP

[57] ABSTRACT

A data processing system and method for generating a representation of an electronic document, for indexing the electronic document, for navigating the electronic document using its representation and for displaying the electronic document on an output device. The system and method are used with electronic documents having descriptive markup which describes the content or meaning of the document rather than its appearance. Such documents may be represented by a tree. Each markup element defines a node or element in a tree. The tree is represented by providing a unique identifier for each element and for accessing a descriptor of the element. An element descriptor preferably includes indications of the parent, first child, last child, left sibling, right sibling, type name and text location for the element. The document representation is used to facilitate navigation of the text for constructing navigational aids such as table of contents and full text indexing. A document is also provided with a style sheet for specifying desired formatting characteristics for each type of element in the document. To display the document, a suitable starting point is found on the basis of a selected starting point. The document is displayed beginning with the suitable starting point and the format characteristics for each element displayed are retrieved from the style sheet and applied to the text of the displayed element.

30 Claims, 22 Drawing Sheets

U.S. PATENT DOCUMENTS

| | | | |
|---|---|---|---|
| 4,969,093 | 11/1990 | Barker et al. | 364/900 |
| 4,970,678 | 11/1990 | Sladowski et al. | 364/900 |
| 4,992,972 | 2/1991 | Brooks et al. | 364/900 |
| 4,996,665 | 2/1991 | Nomura | 364/900 |
| 5,001,654 | 3/1991 | Winiger et al. | 364/523 |
| 5,008,853 | 4/1991 | Bly et al. | 364/900 |
| 5,068,809 | 11/1991 | Verhelst et al. | 395/145 |
| 5,079,700 | 1/1992 | Kozoll et al. | 395/700 |
| 5,089,956 | 2/1992 | MacPhail | 395/600 |
| 5,108,206 | 4/1992 | Yoshida | 400/61 |
| 5,113,341 | 5/1992 | Kozol et al. | 364/419 |
| 5,119,491 | 6/1992 | Iwai et al. | 395/600 |
| 5,130,924 | 7/1992 | Barker et al. | 364/419 |
| 5,133,051 | 7/1992 | Handley | 395/148 |
| 5,140,521 | 8/1992 | Kozol et al. | 364/419 |
| 5,140,676 | 8/1992 | Langelaan | 395/145 |
| 5,142,615 | 8/1992 | Levesque | 395/131 |
| 5,144,555 | 9/1992 | Takadachi et al. | 364/419 |
| 5,144,557 | 9/1992 | Wang et al. | 364/419 |
| 5,146,552 | 9/1992 | Cassorla | 395/145 |
| 5,173,853 | 12/1992 | Kelly et al. | 364/419 |
| 5,181,162 | 1/1993 | Smith et al. | 364/419 |
| 5,182,709 | 1/1993 | Makus | 364/419 |
| 5,185,698 | 2/1993 | Hesse et al. | 364/419 |
| 5,202,977 | 4/1993 | Pasetes | 395/131 |
| 5,214,696 | 5/1993 | Keiser, III et al. | 380/4 |
| 5,220,657 | 6/1993 | Bly et al. | 395/425 |
| 5,241,624 | 8/1993 | Torres | 395/129 |
| 5,241,671 | 8/1993 | Reed et al. | 395/600 |
| 5,276,793 | 1/1994 | Borgendale | 395/148 |
| 5,285,526 | 2/1994 | Bennett, III et al. | 395/146 |
| 5,293,473 | 3/1994 | Hesse et al. | 395/146 |
| 5,355,497 | 10/1994 | Cohen-Levy | 395/700 |
| 5,367,621 | 11/1994 | Cohen et al. | 395/154 |
| 5,384,703 | 1/1995 | Withgott et al. | 364/419.1 |
| 5,428,529 | 6/1995 | Hartrick et al. | 364/419.1 |
| 5,491,820 | 2/1996 | Belove et al. | 395/600 |
| 5,495,607 | 2/1996 | Pisello et al. | 395/600 |
| 5,524,253 | 6/1996 | Pham et al. | 395/800 |
| 5,530,852 | 6/1996 | Meske, Jr. et al. | 395/600 |
| 5,546,577 | 8/1996 | Marlin et al. | 395/600 |
| 5,553,216 | 9/1996 | Yoshioka et al. | 395/145 |
| 5,553,284 | 9/1996 | Barbara et al. | 395/600 |
| 5,557,720 | 9/1996 | Brown, Jr. et al. | 395/146 |
| 5,557,722 | 9/1996 | DeRose et al. | 395/148 |
| 5,572,643 | 11/1996 | Judson | 395/793 |
| 5,613,134 | 3/1997 | Lucus et al. | 395/788 |
| 5,623,652 | 4/1997 | Vora et al. | 395/610 |
| 5,634,051 | 5/1997 | Thomson | 395/605 |
| 5,644,776 | 7/1997 | DeRose et al. | 395/761 |
| 5,708,806 | 1/1998 | DeRose et al. | 395/615 |

OTHER PUBLICATIONS

Brian K. Reid, "SCRIBE: A Document Specification Language and its Compiler," University Microfilms International, Dissertation Services (1991), pp. 53–141.

Chamberlin et al., "Janus: An interactive document formatter based on declarative tgs", IBM System Inl 21(3) 1982:250–271.

Abandoned patent application 07/317.248, filed Feb. 28, 1989, cited in U.S. patent 5,214,696.

"Distributed Bindery Control System", 240/Research Disclosure, Apr. 1993, disclosed anonymously, No. 34829.

"A technique for Sharing Data Among Elements of a Hierarchic Document," disclosed anonymously 28983.

"Intelligent Text and Image Handling", Proceedings of RIAO '91, Apr. 2–5, 1991, Barcelona, Spain, (Amsterdam: Elsevier Publishers 1991), pp. 226–244.

Chamberlin, D. "Managing Properties in a System of Cooperating Editors", Proc. Int. Conf. On Electronic Publishing, Gaithersburg, MD, Sep. 1990 (Cambridge: Cambridge University Press, 1990), pp. 31–46.

Chamberlain et al., "Ouill: An Extensible System for Editing Documents of Mixed Type," IEEE 1988, pp. 317–326.

J.H. Combs, A.H. Renear, and S.J. DeRose, "Markup Systems and the Future of Scholarly Text Processing," Comm. of the Assoc. for Computing Machinery, Nov. 1987, pp. 933–947.

S.J. DeRose, D.G. Durand, E. Mylonas and A.H. Renear, "What is Text, Really?" Journal of Computing in Higher Education, 1990, vol. I, No. 2, pp. 3–26.

S.J. DeRose, "CDWord Tutorial," Dallas: CDWord project, Dallas Theological Seminary, 1989.

S.J. DeRose and D.G. Durand, "Applications of Hypertext to Humanistic Textual Scholarship," Unpublished manuscript submitted Jul. 22, 1987 for Hypertext '87 Conference.

R. Furuta, J. Scofield, and A. Shaw, "Document Formatting Systems: Survey, Concepts, and Issues." Computing Surveys 14(3), 1982, pp. 417–472.

P. Kahn, "Webs, Trees, and Stacks: How Hypermedia System Design Affects Hypermedia Content," Proceedings of Third International Conf. on Human–Computer Interaction, Boston, MA, Sep. 18–22, 1989.

S.P. Mudur, A.W. Narwekar and A. Moitra, "Design of Software for Text Composition," Software—Practice and Experience (9), 1979: pp. 313–323.

J.R. Remde, L.M. Gomez, and T.K. Landaur, "SuperBook: An Automatic Tool for Information Exploration—Hypertext?", Proceedings of Hypertext '87 Chapel Hill: Dept. of Computer Science, U of N.Carolina, 1987.

"DynaText: Electronic Book Engine from EBT," The Seybold Report on Publishing Systems, vol. 20, No. 2, Sep. 14, 1990, Seybold Publishing, Inc., Media, PA.

J.B. Smith and S.F. Weiss, "Formatting Texts Accessed Randomly," Textlab Report TR85–031, Chapel Hill: U of North Carolina, 1985.

D. Knuth, "The Art of Computer Programming," (Reading, Mass.: Addison–Wesley, 1973, pp. 332–338, 347–362.

N. Yankelovich, N. Meyrowitz, and A. vanDam, "Reading and Writing the Electronic Book," IEEE Computer, 18 (1985), pp. 15–30.

K. Robertson, J.M. Kelsey, and V. Yenbut, "ESP User's Guide," U. of Washington, Computer Science Lab. Tech. Note #134, Rev. C. Sep. 20, 1982.

A.C. Shaw, "A Model for Document Preparation Systems," U. of Washington, Dept. of Computer Science, Tech. Report No. 80–04–02, Apr. 980.

M.J. Fischer and R.E. Ladner, "Data Structures for Efficient Implementation of Sticky Pointers in Text Editors," U. of Washington, Dept. of Computer Science, Tech. Report No. 79–06–08, Jun. 1979.

T. Allen, R. Nix and A. Perlin,"PEN: A Hierarchical Document Editor," In Proc. ACM SIGPLAN SIGIOA Symp. Text Manipulation, SIGPLAN Notices (ACM) 16, 6 (Jun. 1981), pp. 74–81.

S.A. Weyer, "The Design of a dynamic Book for Information Search," In the. J. Man–Machine Studies (1982), 17, 87–107.

M.E. Frisse, "Searching for Information in a Hypertext Medical Handbook," Hypertext '87 Proceedings, Chapen Hill, North Carolina, 1987, New York: ACM, pp. 57–66.

C.H. Irby, "Display Techniques for Interactive Text Manipulation," AFIPS Conference Proceedings, 1974 National Computer Conf. and Exposition, vol. 43, Montvale, New Jersey: AFIPS Press, 1974.

D. Thursh and F. Mabry, "An Interactive Hyper–Text of Pathology," Proceedings of Fourth Annual Symposium on Computer Applications in Medical Care, Nov. 1980.

S.A. Weyer and A.H. Borning, "A Prototype Electronic Encyclopedia," ACM Transactions on Office Information Systems, vol. 3, No. 1, Jan. 1985, pp. 63–88.

J.S. Brown, "Process Versus Product: A Perspective on Tools for Communal and Informal Electronic Learning," J. Educational Computing Research, vol. 1(2), 1985, pp. 179–201.

D.D. Chamberlin et al., "Janus: An Interactive System for Document Composition," In Proc. ACM SIGPLAN SIGOA Symp. Text Manipulation, SIGPLAN Notices (ACM) 16, 6 (Jun. 1981), pp. 82–91.

C. Binder, "The Window Book Technology," Cambridge, Massachusetts: Box Company, 1986.

S.A. Borkin and J.M. Prager, "Some Issues in the Design of an Editor–Formatter for Structured Documents," Cambridge Scientific Center Technical Report, G320–2136, Sep. 1981.

D.C. Engelbart and W.K. English, "A Research Center for Augmenting Human Intellect," In Proc. Fall Joint Computer Conf., vol. 33, 1968, AFIPS Press, Arlington, Virginai, pp. 395–410.

N. Wirth, "Data Structures and Algorithms," Englewood Cliffs, New Jersey: Prentice Hall, 1976, pp. 242–245.

```
<!ENTITY EBT CDATA
    "ELECTRONIC BOOK TECHNOLOGIES, INC.">
45—<BOOK>
    <FRONTMATTER>
        <TITLE>HOW TO USE DYNATEXT</TITLE>
        <AUTHOR>&EBT;</AUTHOR>
    </FRONTMATTER>
46—<BODY>
    <CHAPTER>
        <CHAPTITLE>INTRODUCTION</CHAPTITLE>
        <SECTION>
            <SECTITLE>STARTING UP THE SYSTEM</SECTITLE>
            <P>TO START THE SYSTEM, TYPE
                <EMPH>DTEXT</EMPH></P>
            <P>AFTER THAT JUST BROWSE, AS SHOWN HERE:
49—        <ART FILE ="MYFIG12">
            </P>
48—    </SECTION></></BODY>
47—</BOOK>
```

FIG. 4

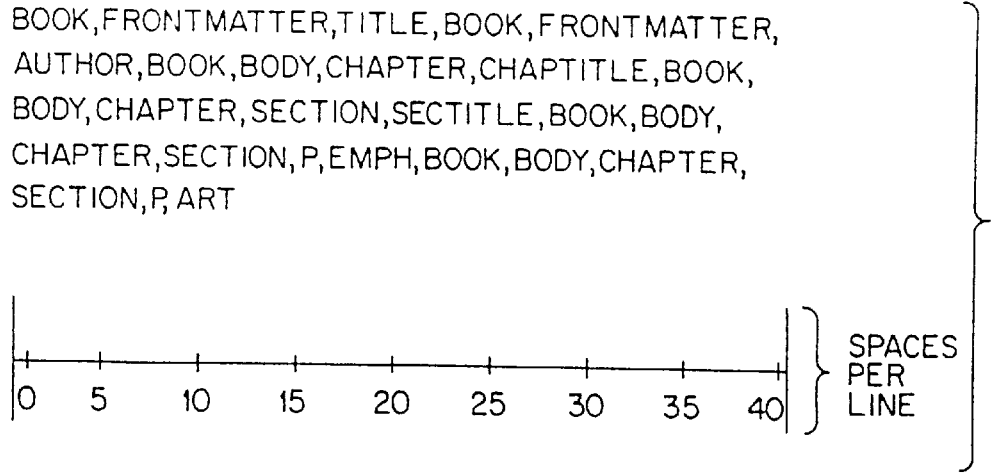

FIG. 7

| | 92 | 94 | 96 | 98 | 100 | 102 | 104 |
|---|---|---|---|---|---|---|---|
| 70 | NIL | 71 | 76 | NIL | NIL | BOOK | NULL |
| 71 | 70 | 72 | 74 | NIL | 76 | BOOK,FM | NULL |
| 72 | 71 | 73 | 73 | NIL | 74 | BOOK,FM,TITLE | NULL |
| 73 | 72 | NIL | NIL | NIL | NIL | #TEXT | \<POINTER\> |
| 74 | 71 | 75 | 75 | 72 | NIL | BOOK,FM,AUTHOR | NULL |
| 75 | 74 | NIL | NIL | NIL | NIL | #TEXT | \<POINTER\> |
| 76 | 70 | 77 | 77 | 71 | NIL | BOOK,BODY | NULL |
| 77 | 76 | 78 | 80 | NIL | NIL | BOOK,BODY,CHAP | NULL |
| 78 | 77 | 79 | 79 | NIL | 80 | BOOK,BODY,...CHAPTITLE | NULL |
| 79 | 78 | NIL | NIL | NIL | NIL | #TEXT | \<POINTER\> |
| 80 | 77 | 81 | 87 | 78 | NIL | ... | NULL |
| 81 | 80 | 82 | 82 | NIL | 83 | ETC. | NULL |
| 82 | 81 | NIL | NIL | NIL | NIL | ... | \<POINTER\> |
| 83 | 80 | 84 | 85 | 81 | 87 | ... | NULL |
| 84 | 83 | NIL | NIL | NIL | 85 | ... | \<POINTER\> |
| 85 | 83 | 86 | 86 | 84 | NIL | ... | NULL |
| 86 | 85 | NIL | NIL | NIL | NIL | ... | \<POINTER\> |
| 87 | 80 | 88 | 89 | 83 | NIL | ... | NULL |
| 88 | 87 | NIL | NIL | NIL | 89 | ... | \<POINTER\> |
| 89 | 87 | NIL | NIL | 88 | NIL | ... | \<POINTER\> |

PARENT, FIRST CHILD, LAST CHILD, LEFT SISTER, RIGHT SISTER, TYPE NAME, TEXT CONTENT

TEXT VIEW — CLOSE

BICYCLE MAINTENANCE MANUAL
  BRAKES
    REPLACING AND DISASSEMBLING PARTS

REPLACING AND DISASSEMBLING PARTS

*BRAKE SHOES:*

☐ SEE P. 218.

*CABLES:*

THE FREQUENCY WITH WHICH YOU WILL NEED TO REPLACE BRAKE (AND OTHER) CABLES DEPENDS ON HOW YOU USE YOUR BIKE. MACHINES CONSISTENTLY LEFT OUT IN THE RAIN, OR USED HARD EVERY DAY, ARE GOING TO NEED THEM SOONER THAN WELL-CARED-FOR OR AVERAGE-USE MACHINES. THERE IS NO HARD AND FAST RULE. ANY OBVIOUS DEFECT, SUCH AS A FRAYED CABLE: ...D FOR REPLACEMENT.

---

TEXT VIEW — CLOSE

BICYCLE MAINTENANCE MANUAL
  BRAKES
    ROUTINE ADJUSTMENTS

ROUTINE ADJUSTMENTS

CALIPER BRAKES

WHATEVER KIND OF CALIPER BRAKE SYSTEM YOU HAVE, THERE ARE TWO BASIC KINDS OF ADJUSTMENTS: (1) SEEING THAT THE BRAKE SHOE HITS THE WHEEL RIM PROPERLY, AND (2) KEEPING SLACK OUT OF THE CABLE BETWEEN THE BRAKE LEVER AND MECHANISM, SO THAT THE LEVER TRAVELS THE SHORTEST POSSIBLE DISTANCE WHEN PUTTING ON THE BRAKES.

FIRST CHECK TO SEE THAT THE WHEEL IS TRUE BY SPINNING IT AND SEEING THAT THE RIM, NOT THE TIRE, STAYS ABOUT THE SAME DISTANCE FROM THE BRAKE SHOE ALL THE WAY AROUND.

---

TABLE OF CONTENTS — BICYCLE

BICYCLE MAINTENANCE MANUAL
  BRAKES
    GENERAL
    HOW CALIPER BRAKES WORK
    LUBRICATION
    " ROUTINE ADJUSTMENTS

```
<STYLE NAME="BOOK">              <!-- TOP TAG OF DOCUMENT -->
    <FONT-FAMILY>    TIMES           </>
    <FONT-SIZE>      &STD.SIZE;      </>
    <FONT-SLANT>     ROMAN           </>
    <FONT-WEIGHT>    MEDIUM          </>
    <FOREGROUND>     BLACK           </>
    <LEFT-INDENT>    10              </>
    <RIGHT-INDENT>   12              </>
    <LINE-SPACING>   &STD.LEAD;      </>
</STYLE>

<STYLE NAME="TI">                <!-- MAIN (BOOK) TITLE -->
    <FONT-FAMILY>    &TI.FONT;       </>
    <FONT-SIZE>      24              </>
    <FONT-WEIGHT>    BOLD            </>
    <FOREGROUND>     &TI.COLOR;      </>
    <LINE-SPACING>   28              </>
    <JUSTIFY>        &TI.JUSTIFY;    </>
    <BREAK>          ON              </>
</STYLE>

<STYLE NAME="CT">                <!-- CHAPTER (CHP) TITLE -->
    <FONT-FAMILY>    &TI.FONT;       </>
    <FONT-SIZE>      20              </>
    <FONT-WEIGHT>    BOLD            </>
    <FOREGROUND>     &TI.COLOR;      </>
    <LINE-SPACING>   24              </>
    <JUSTIFY>        &TI.JUSTIFY;    </>
    <SPACE-BEFORE>   36              </>
    <BREAK>          ON              </>
</STYLE>

<STYLE NAME="SEC,ST">            <!-- SECTION TITLE -->   </>
    <FONT-FAMILY>    &TI.FONT;       </>
    <FONT-SIZE>      18              </>
    <FONT-WEIGHT>    BOLD            </>
    <FOREGROUND>     &TI.COLOR;      </>
    <LINE-SPACING>   20              </>
    <JUSTIFY>        &TI.JUSTIFY;    </>
    <SPACE-BEFORE>   24              </>
    <BREAK>          ON              </>
</STYLE>

<STYLE NAME="SS1,ST">            <!-- SUBSECTION TITLE -->
    <FONT-FAMILY>    &TI.FONT;       </>
    <FONT-WEIGHT>    BOLD            </>
    <FONT-SIZE>      14              </>
    <LINE-SPACING>   17              </>
    <JUSTIFY>        &TI.JUSTIFY;    </>
    <BREAK>          ON              </>
    <SPACE-BEFORE>   12              </>
</STYLE>

<STYLE NAME="P">                 <!-- STANDARD PARAGRAPHS -->
    <BREAK>          ON              </>
    <SPACE-BEFORE>   &STD.VERT;      </>
</STYLE>
```

*FIG. 15*

DATA PROCESSING SYSTEM AND METHOD FOR GENERATING A REPRESENTATION FOR AND RANDOM ACCESS RENDERING OF ELECTRONIC DOCUMENTS

This application is a divisional of application Ser. No. 08/885,578, filed Jun. 30, 1997, entitled DATA PROCESSING SYSTEM AND METHOD FOR GENERATING REPRESENTATION FOR AND RANDOM ACCESS RENDERING OF ELECTRONIC DOCUMENTS, and now U.S. Pat. No. 5,983,248 which is a continuation of application Ser. No. 08/480,611 filed Jun. 7, 1995, issued as U.S. Pat. No. 5,644,776 which is a divisional application of Ser. No. 08/419,051 filed Apr. 7, 1995, issued as U.S. Pat. No. 5,557,722, which is a file-wrapper continuation of application Ser. No. 07/733,204 filed Jul. 19, 1991, abandoned.

FIELD OF THE INVENTION

This invention relates generally to methods and apparatus for formatting documents in electronic or other non-paper media, and more specifically, for generating representations, indexing and rendering on a computer screen of electronic documents. More particularly, this invention relates to indexing and rendering of electronic documents, especially electronic books, having descriptive markup and hierarchical content.

BACKGROUND OF THE INVENTION

Because of the increased availability and use of computers and improved methods of communication between them, it has become common to use non-paper media for transmitting and storing documents. Such media include magnetic and optical disks, tapes and other storage systems. Documents developed and transmitted in such form (hereinafter called electronic documents) are often also viewed on computer display devices and need to be rendered, or displayed, on a computer screen or other output device, in a readable, or formatted form. These systems have become popular for and are particularly useful with very large documents which may be used by many people. Such documents include large system, manuals, engineering designs, and the like.

Many currently available computer systems format and display electronic documents, such as word processors having "what-you-see-is-what-you-get" (WYSIWYG) displays, hypertext systems, and desktop publishing systems. These systems permit one view, or display, of a document at a time. However, currently available systems include formatting specifications in the internal, electronic representation of a document and require reformatting of the whole document if a different format, such as hiding or emphasizing different portions of the text, is desired. Thus, state-of-the-art display processors are not used to their fullest capabilities.

Moreover, most current systems, specifically information retrieval systems, consider text as a stream of graphic display instructions rather than as a hierarchy of various types of objects which have formatting properties which may be changed. Without the ability to change formatting properties of a document, the document is less useful. For example, the document may not be transferrable between different types of computer systems. Furthermore, even those systems which allow changes to formatting properties of a document require time proportional to the document length for reformatting. Although this amount of time may be acceptable for small documents, such delays become objectionable during the display of very large documents.

Electronic documents are often developed and viewed with systems having tools for assisting navigation within the document. Such tools include full text indexing and retrieval (i.e. searching) engines, and, particularly for large documents, tables of contents similar to those for printed books.

Full text indexing and retrieval engines normally index every word found in a document and record the number of occurrences of a word and its location(s) within the document. However, most current systems only identify the total number of occurrences of a word at one level, or division of a document. For example, a system may record the total for a book, or the total for each paragraph in a book. Some systems, however, report totals for a few selected levels within a document, but not cumulative totals over all levels of a document. other systems report whether a word occurs in one level of a document, such as a paragraph (by indicating "yes" or "no"), and cumulate the number of paragraphs in which the word occurs rather than the number of occurrences of the word. These systems fail to take full advantage of more advanced document structures to enable a user to find relevant portions of a document.

It is also common to use a thesaurus, Boolean logic, and context-based retrieval mechanisms along with such indexing and retrieval engines. However, engines with such mechanisms do little to improve the determination-of the relevance of portions of a document if separated from document structure. Moreover, such additional searching procedures, especially those which incorporate a thesaurus, require additional setup and time which may be objectionable to a user.

Tables of contents are also used to assist navigation of a document in current systems; however these systems lack more advanced structures which further assist a user in finding relevant portions of a document.

As described above, current systems have failed to provide the fullest capability for a user to navigate readily an electronic document and to manipulate such a document on a variety of output devices in an efficient manner. This failure is due primarily to the conception of text formatting as a sequence of formatting instructions, and to the representation of an electronic document resulting from such a conception. For example, in current systems, format specifications are normally integrated with a document to create a document containing a sequence of display instructions. These format specifications also normally include pagination. However, with electronic and other systems which do not depend on paper, pagination is neither necessary nor desirable. Such systems fail to separate the text content from the text form.

Accordingly, it is an object of the present invention to provide a data processing system and method which permits simultaneously displaying multiple views of various portions of an electronic document, each having its own (possibly distinct) format specification.

It is another object of the present invention to provide a data processing system and method of rendering documents which treats text in a manner separate from formatting properties.

It is a further object of the present invention to provide a data processing system and method for rendering an electronic document which allows changes to the specified format of the document and displays the document with the changed format from a selected viewing location immediately without reformatting the whole document.

It is another object of the present invention to provide a data processing system and method for indexing electronic documents which reports, for selected words, the number of occurrences of that word within each section and subsection of the document.

It is another object of the present invention to provide a data processing system and method for enhancing the ability of a user to determine the relevant portions of a document.

It is another object of the present invention to provide a data processing system and method for generating a representation of an electronic document which enables immediate display and formatting of the document for multiple views, improved determination of relevant portions of the document, simple selection of portions of the document for viewing, and the attachment of private and public annotations.

SUMMARY OF THE INVENTION

In view of the foregoing and other objects of the present invention, there is provided a data processing system and method for generating a representation of an electronic document, for indexing the electronic document to generate the representation, for navigating the electronic document using its representation and for displaying the electronic document, formatted according to a style sheet, on an output device.

The system and method of the present invention is most useful with electronic documents having descriptive markup, such as the Standard Generalized Markup Language (SGML). Descriptive markup is used to denote the function or meaning of portions of the content of the document (such as a "chapter" ) and normally not the appearance (such as "centered").

Such electronic documents may be understood as a tree-like structure. An element, or node, of the tree is defined by the markup in the electronic document. An element thus may have a parent element, a child element, a left sibling element and/or a right sibling element. An element may also contain text. The text content may be considered to be a child element of its containing element.

Each element in an electronic document is assigned a type name according to its markup. The type name may also include the type names of a parent element and of previous parent elements, thus indicating the context in which an element occurs in the document. Such a type name is called a qualified name. The type name identifying the complete context of an element is the fully-qualified name.

A document is also provided with one or more style sheets for specifying format characteristics for its display. A style sheet includes format characteristics for type names of elements in the document. Not all fully-qualified, qualified or non-qualified names need to have specified format characteristics. Format characteristics include font styles and size, margins and other details relating to appearance and behavior of the document. The style sheets are normally stored separately from their corresponding document.

In order to display a document on an output device in a manner that enables a user to navigate it readily and to find, as much as possible, its relevant portions, a suitable representation of the document is needed. This representation depends on the capabilities desired to be provided to a user, and should allow quick access to document elements.

One capability provided by the system and method of the present invention is rapid random access to any given point within a document and display of the document from that point. The document tree is traversed starting at the randomly accessed point from a randomly accessed point in a manner which allows a pre-function to be applied to each element before any of that elements child elements are visited, and which allows a postfunction to be applied to each element after its child elements are visited. The pre- and post functions correspond respectively to the beginning of a markup element (i.e. its start tag) and the end of a markup element (i.e. its end tag). Format specifications are retrieved from the style sheet according to the (possibly qualified) type name of each element visited in the traversal. Format specifications for an element are applied to content of the element. To facilitate traversal of the document from a selected element, there is provided a representation of the document including, for each element, a field for storing the type name of the element and preferably fields for storing an indication of any parent element, any right sibling element, and, for each element having a child element, at least the first child element.

An additional capability provided by the system and method of the present invention is display of a document beginning from a point which occurs after a line break, or other breaking point, in the format. A randomly accessed element may occur in a document at a location which may not be placed after a line break when formatted and displayed. For a more aesthetically pleasing display, the document is traversed backwards to find an element before or after which a breaking point occurs. The breaking point may be found either by examining the format specifications of elements preceding the randomly accessed element or by examining the type of these elements. Preferably, the first suitable element preceding the randomly accessed element is found, with formatting and display of the text of the document beginning with this element. To facilitate the backwards traversal of a document, the representation of a document further includes a field for storing an indication of any left sibling element, and, for each markup element having a child element, a field for storing an indication of the last child element.

A further capability provided by the system and method of the present invention is inheritance of format characteristics. An element selected for display may be displayed according to format specifications of its parent element. Thus, the format specifications for its parent and any preceding parent elements are retrieved and evaluated before traversal of the element. By using a stack, evaluated format specifications for higher levels of a tree may be retained during traversal of the document for display. Caching mechanisms may also be used for retaining evaluated format specifications.

Another capability provided by the system and method of the present invention is scrolling of a displayed document. Scrolling of a displayed document results in the retrieval of the elements which- immediately precede or follow the currently displayed element. The document may then be displayed beginning with this preceding or following element. To facilitate the retrieval of these elements, the representation of the document further includes unique element identifiers assigned to each element in the document. The fields of the element directory store the unique identifiers for their corresponding elements. These element identifiers are preferably numbers which are sequentially assigned to the elements in the document in the order that these elements appear in the document.

In another aspect of the present invention, there is provided a system and method for generating a table of contents for a document for assisting a user in finding relevant portions of a document and in selecting a starting point for its display. The document is traversed from the start of the document in a manner similar to the display traversal.

During the traversal, for each element of the document which has a title, a record is established. This record includes the element identifier of the element and the element identifier of the next element of the same or higher level in the document. An indication of the level of the element in the tree, or of how many of the elements which contain it have titles, may also be stored. The table of contents may be displayed in a manner similar to the actual document. Preferably, the table of contents may be expanded and contracted by a user to display different levels within a document, such as done by standard outline processors.

In another aspect of the present invention there is provided a system and method for hierarchical full text indexing of a document and means operative in response to a search request for combining results of the index with other document navigation tools, such as a table of contents. Standard full text index and retrieval engines may be used to index text in a document. According to the present invention, the results of the index for a word are stored in a record which includes the element identifiers for text elements in which the word occurs and the number of occurrences of the word in each of those elements. Before results of the index for a word are displayed, in combination with the table of contents, results for all elements in the document are cumulated. Cumulation may be performed at the time of full text index processing or when a search request is made.

In order to provide the above capabilities of the present invention, there is provided an element directory for representing the document, which combines the representations described separately above. The element directory is an array of element descriptors, wherein each descriptor corresponds to an element of the document. The elements are preferably assigned unique element identifiers which are used to access the corresponding element descriptors. An element descriptor for an element preferably includes a field for each of the following types of elements with which it may be associated: a parent element, a first child element, a last child element, a left sibling element and a right sibling element. The element descriptor also preferably includes a field for indicating the fully-qualified type name of the element and a pointer field for any text content or attributes of the element. Furthermore, each element descriptor preferably has the same size.

The fully-qualified type name field is also preferably constant in size for each element descriptor. This constancy may be obtained by generating a fully-qualified name table and indicating in the element descriptor for an element the location in the table of its fully-qualified name. Preferably, the fully-qualified name table is a compressed list and the location of a name in the list is indicated by its offset in the list and the length of the name.

Another aspect of the present invention is the generation of an element directory and a fully-qualified name table from an electronic document having descriptive markup. This process of generating the representation of the document involves parsing the document to identify where markup elements begin and end, and which elements contain text. when the document is sequentially parsed, the order that elements appear in a document may be readily determined. Consequently, sequential, numeric, unique identifiers may be assigned to each element of the document. The relationship among elements, such as parent, child and sibling elements, also may be readily determined. Thus the element descriptors may be constructed.

The process of generating the document representation and hierarchical full text indexing of the present invention may be performed by the publisher of the electronic document. A reader of the document may cause the display processes to be performed on this document. When a user selects a document, the table of contents is displayed. The user is also provided with the option of searching for a selected word in a manner which is familiar to those skilled in the art, such as by using "menus".

In another aspect of the present invention a user may also make annotations to a viewed document or maintain lists of selected starting points.

Annotations may be made using standard mechanisms, common in hypertext systems, such as "webs". Such annotations, according to the present invention, include the element identifier of the element of a document to which an annotation is attached. The process of displaying a document searches the web for annotations attached to an element to display an indication to the user that such an annotation exists.

Lists of selected starting points, commonly called "bookmarks," may also be generated by a process which records at least the element identifier of the selected elements. This process may be operative in response to the selection and subsequent display of an element by a user. These lists may also be displayed to allow a user to select a starting point for displaying the document.

All of the annotations and other lists preferably are stored in the same format. This format is preferably readily portable and the same as the format for the document itself. That is, the same descriptive markup language is used to construct these lists.

BRIEF DESCRIPTION OF THE DRAWINGS

The operation and advantages of the present invention will be more fully understood from the detailed description below, which should be read in conjunction with the accompanying drawing, in which:

FIG. 4 is an illustration of a sample document with descriptive markup;

FIG. 6 is an illustration of an element directory of the present invention, with example values corresponding to the document of FIGS. 4 and 5;

FIG. 7 is an illustration of a fully-qualified name table of the present invention with example values corresponding to the document of FIG. 4;

FIGS. 12–14 are example display views as produced by the system and process of the present invention;

FIG. 15 illustrates a preferred embodiment of a style sheet for use with the present invention;

DETAILED DESCRIPTION

Figure 1:
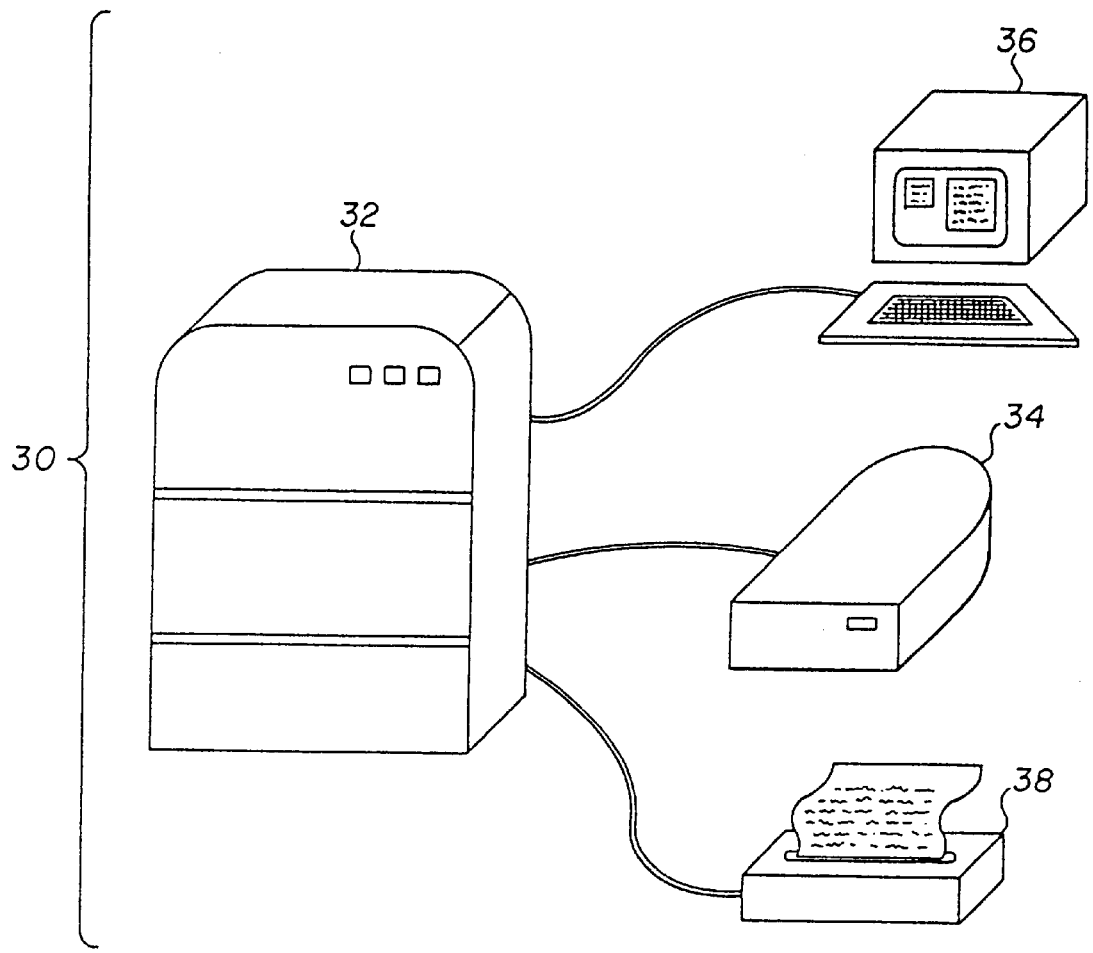
FIG. 1 is an illustration of a data processing system in which the present invention may be utilized.

A data processing system in which the present invention may be used is depicted in FIG. 1. The data processing system 30 includes a main processing unit 32 having a mass storage device 34, such as a disk drive. The mass storage device 34 may be internal (not shown) or external (as shown) to the main unit 32. The data processing system also includes an output device such as a monitor, or graphic display 36 and, optionally, printer 38. The main unit 32, combined with display 36, is preferably programmed to enable multiple simultaneous views, popularly known as "windows", which facilitates providing the user with multiple views of a document. A current embodiment of the invention employs, as the data processing system 30, a Sun-4™ workstation running SunOS™ Release 4.1 (a trademark of Sun Microsystems, Inc.) or higher. The workstation also includes an X Window Systems™ (a trademark of the Massachusetts Institute of Technology) server and a ICCCM Compliant Window Manager as the program or, process for enabling multiple views. A Release 4 X Server is recommended for best performance. Further details on installation of an embodiment of the present invention on such a system is provided in the attached Appendix A. Appendix A is a manual entitled "DynaText™ System Installation and System Administration Guide Release 1.0". This document should not be printed.

Figure 2:
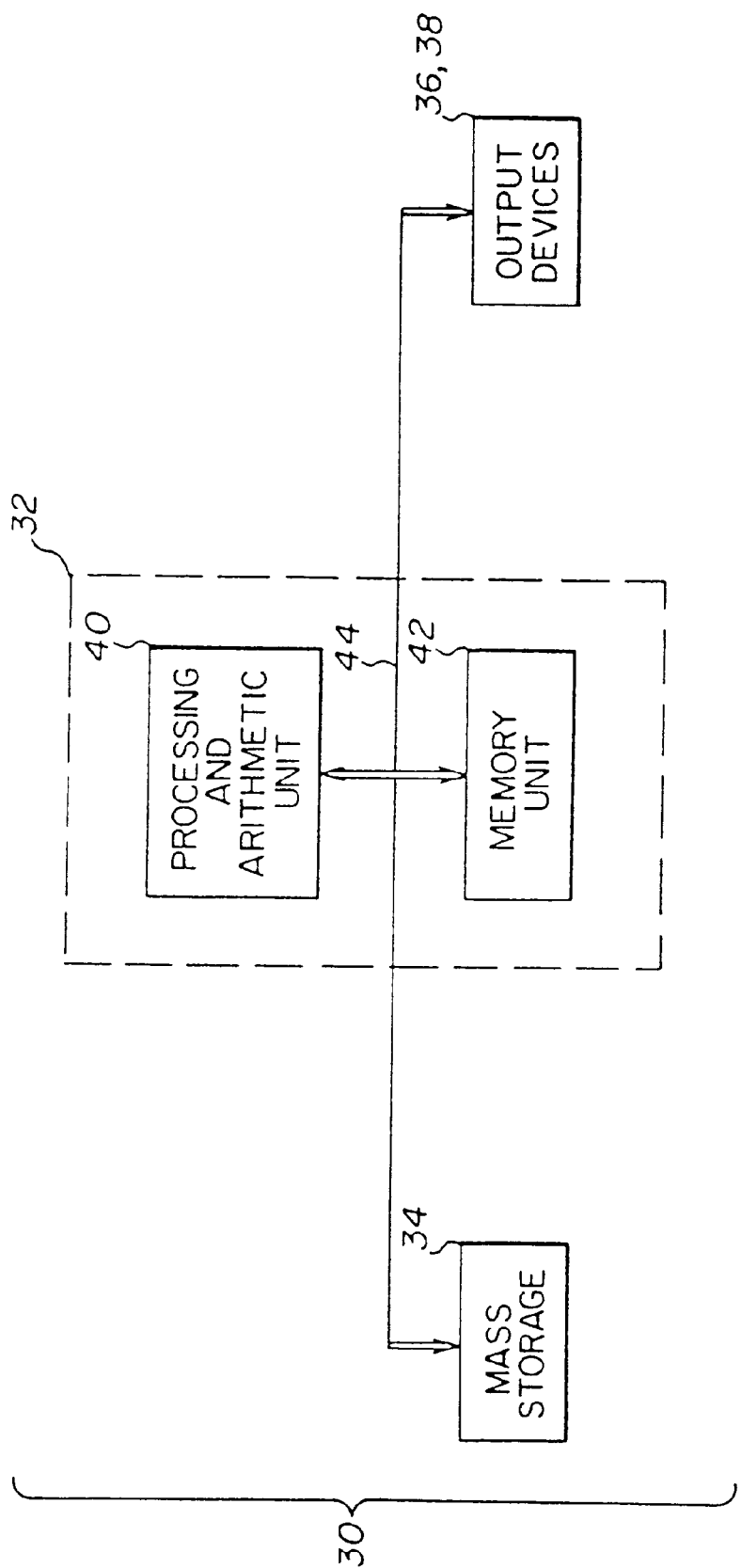
FIG. 2 is a block diagram of the data processing system of FIG. 1.

FIG. 2 shows further detail of the structure of the data processing system 30. The main unit 32 includes a processing and arithmetic unit 40 and a memory unit 42 connected to the processing unit via a bus 44. Mass storage 34 is also connected to the memory unit and. processing unit via the bus 44 along with the output devices 36 and 38. The memory unit- 42 preferably has 8 MB. of random-access memory (RAM) and 16 MB of virtual memory. It has also been found that 2 MB RAM is suitable for a data processing system including an IBM-PC compatible machine.

The data processing system may be configured to perform the process of the present invention using a typical programming language such as the "C++" programming language. It should be apparent to those skilled in the art that the present invention is not limited to a specific programming language or data processing system and that other appropriate programming languages and other appropriate data processing systems could also be used.

Figure 3:
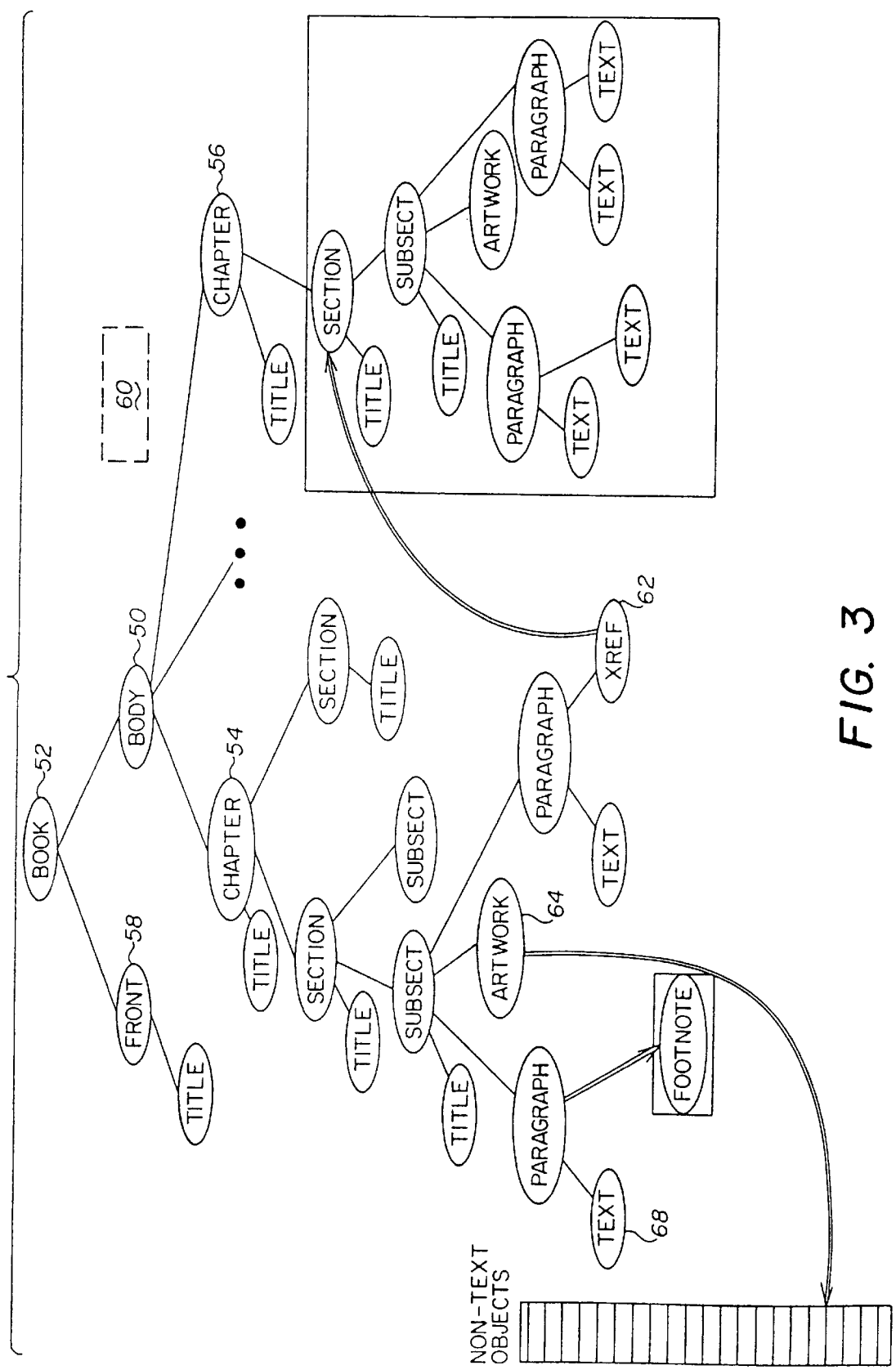
FIG. 3 is a diagrammatic illustration of the hierarchical structure of an example document with which the present invention may be used.

The system of the present invention receives as its input a document, represented in electronic form, which includes text content, descriptive markup and possibly non-text content. Electronic documents include, but are not limited to, electronic books and operation manuals for large systems, such as for airplane maintenance, etc. The descriptive markup of an input document is interpretable as an ordered hierarchy of content objects, such as illustrated in FIG. 3. That is, the descriptive markup defines a structure including a set of elements which, when taken together, form a tree or similar hierarchical object. A markup element describes the function or meaning, rather than the appearance, of the text which it includes. Elements representing only appearance or format characteristics may be used, but are non-optimal.

In such a document, an element, e.g. element 50 of FIG. 3, may have a parent element (52), a first child element (54), a last child element (56), a left sibling element (58), and a right sibling element (60). In the example just described, a right sibling of element 50 does not exist in the document, and is therefore defined by "nil", or some non-element identifier. Similarly, if an element does not have first or last children elements, left sibling element, or a parent element, the corresponding values are also defined to be 'nil' or some other non-element identifier. The text content elements 68 of a document are normally found as the leaves of a tree.

A document may also include other types of elements which do not describe function, meaning or appearance of the text. These types of elements include cross-referencing elements 62 which may be used to link relevant sections of a document or even separate documents. Artwork elements 64 may be used to point to non-text objects, such as graphic raster files, which also may be separate electronic documents.

An example of a descriptive markup language for electronic documents is specified by ISO standard 8879: Standard Generalized Markup Language, or, "SGML". This standard is described in "Information Processing—Text and office Systems—Standard Generalized Markup Language (SGML)," by the International Organization for Standardization, ISO 8879–1986(E), which is hereby incorporated by reference. Documents in SGML may be created using standard text editors, such as SoftQuad Author/ Editor™, which is commercially available from SoftQuad, Inc., of Toronto, Ontario, Canada. The "Scribe" word processing language is a similar document markup language. Other suitable markup languages may also be used.

The preferred embodiment of the present invention provides the capability for rendering documents which comply with the SGML standard. Such documents are preferred because of the acceptance of the standard by publishers and government agencies. SGML compliant documents may be made from other types of documents using commercially available systems. A simple exemplary SGML compliant document is provided in FIG. 4. This example is used to illustrate the process and data structures of the present invention and is not limiting, as the system of the present invention may be used readily with arbitrarily large documents. An SGML document includes markup tags which may be described as start tags, end tags, or empty tags. An empty tag may be understood as being both a start tag and an end tag. In this sample document of FIG. 4, start tag 45 begins a markup element. An end tag, such as end tag 47, ends the corresponding markup element. Elements having start and end tags occurring between the start and end tags of another element (as tags 46 and 48 are between tags 45 and 47) are defined to be children or lower elements of the tree defined by the markup structure. Children at the same level beneath a parent are siblings.

Some of the tags in the descriptive markup of the document may also be empty tags such as tag 49 (FIG. 4). Such empty tags may be used for cross-referencing, referencing other documents, or for referencing graphic or other types of non-text information, etc. These tags often have attributes which are variables, such as "file", to which are assigned values, such as "myfig12". These attributes may be interpreted when the document is rendered to retrieve graphics files, etc. Normal start tags 45 may also include attributes which are often useful for marking text which is to be hidden for security or other reasons, or for attaching a unique identifier for an element for cross-referencing or other uses. For example, when a document is rendered, an attribute for a start tag may be examined, and if the attribute has a predetermined value, display of that material may be prevented or modified, thus providing security for a document.

Figure 5:
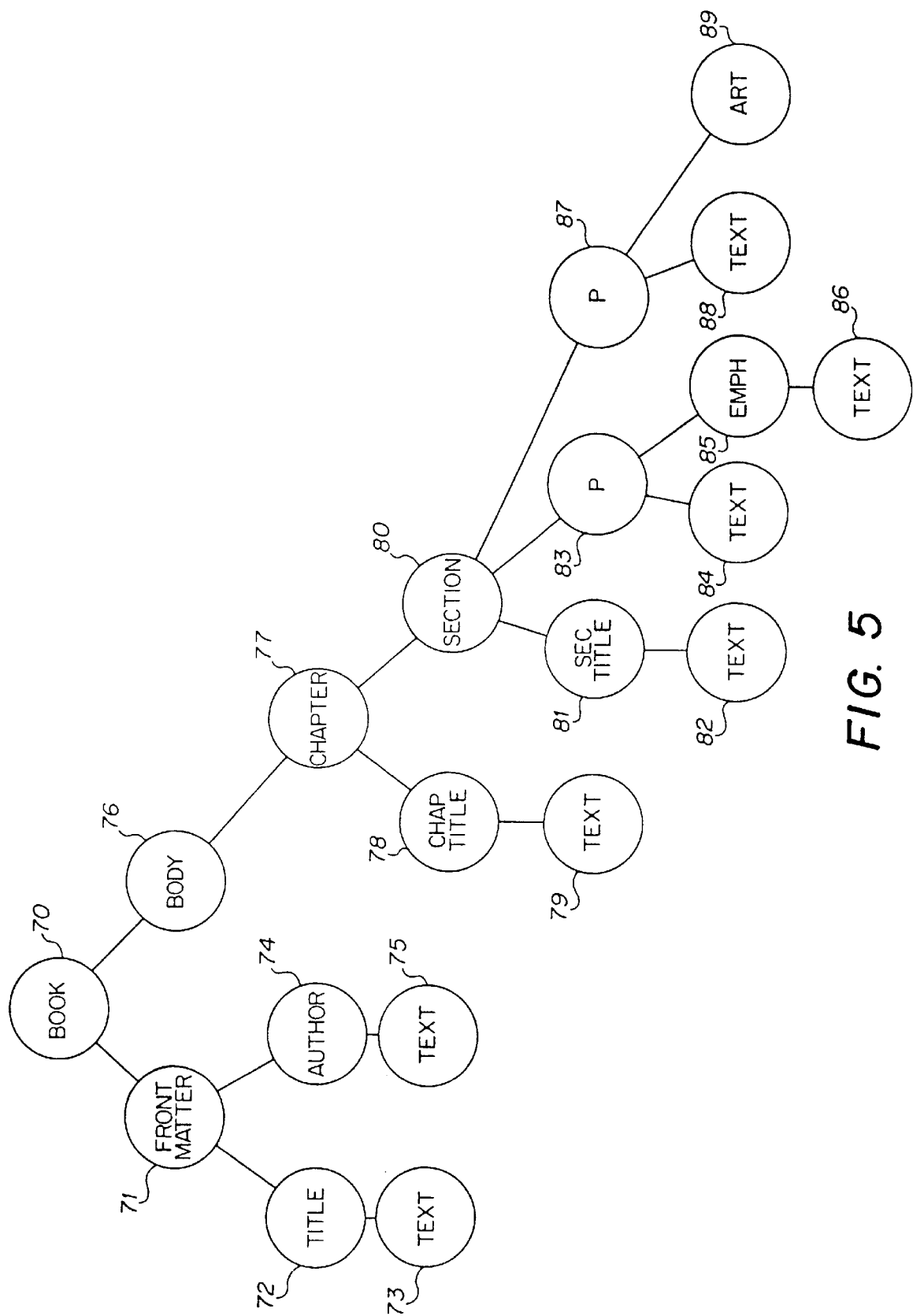
FIG. 5, is a diagrammatic illustration of the hierarchical structure of the sample document of FIG. 4.

FIG. 5 is a representation of the tree structure generated from the sample SGML document of FIG. 4. Reference numbers 70–89 have been assigned to the elements defined by the markup structure of the SGML document. It is preferable to assign sequential numbers, or element identifiers, to each element appearing in the document according to the order of appearance of these elements in the document. These element identifiers are used in the generation of the document representation of the present invention, the element directory 91 (FIG. 6), which is used to improve navigation of the document.

The data structure of FIG. 6, the element directory 91, is an array of element descriptors 90. Each element descriptor 90 represents an element of the document. In the preferred embodiment, an element descriptor 90 is easily retrieved from the array on the basis of the element identifier which is assigned to its corresponding element. The element descriptor 90 includes a field 92 for representing the parent of the element, a field 94 for representing the first child, a field 96 for representing the last child, a field 98 for representing a left sibling, a field 100 for representing a right sibling, a field 102 for representing the type of the element, and a field 104 for representing the location of text characters for a text chunk or the location of other data associated with the element such as attributes. Those fields which represent elements, such as parent, child and sibling elements, preferably contain the element identifiers assigned to those elements.

The above-described representation of an element descriptor may be further optimized for documents which are not modified after its element directory is generated. In this case, the element identifier of a first child of an element is always the immediately succeeding element identifier of that element. Thus, this field may be reduced to a one-bit representation, e.g. '1' may indicate that there is a first child and '0' that there are no children.

Another variation for the element directory 91 may include element descriptors 90 of variable size. Since a descriptor 90 may have a few NIL values, the size of the corresponding fields may be reduced. An element descriptor 90 may then be accessed from a file according to the offset or location in the file and length of the descriptor 90. Element identifiers assigned to element descriptors may be mapped to the values of the offset and length of their corresponding element descriptors. Such a modification may reduce the size of the element directors 91, but increases the time it takes to access an element descriptor.

In the example of FIG. 6, element descriptor 90 corresponds to element 70 of FIG. 5. Since element 70 does not have a parent element, parent field 92 includes a non-element value. Similarly, left and right sibling fields 98 and 100 also include non-element values. Field 102 includes a representation that element 70 is of the type, "book".

It is preferable that the size of element type field 102 remain constant across all element descriptors. In the preferred embodiment of the present invention the element type in field 102 is represented by a pointer to another data structure, or data file, called the fully-qualified name table. The fully-qualified name table is a list of element types encountered in the document. The pointer includes a representation of the offset, or location, of the element type in the fully-qualified name table and possibly the length of the type name.

A preferred embodiment of a fully-qualified name table is represented as a compressed list in FIG. 7. The list is compressed by representing as many sequential types as possible in a compressed form. That is, rather than having a list of:

"BOOK"
"BOOK,FRONTMATTER" The list is compressed to "BOOK, FRONTMATTER".

Thus, repeated occurrences of a type name may be eliminated. The table of FIG. 7 corresponds to the example document represented by FIGS. 4–6 and is to be understood as a stream of characters. Thus, as an example, field 102 for element 70 (of type "BOOK") would show an offset of 0 and a length of 4, since the first occurrence of "BOOK" is at the beginning of the table and has a length of four characters. Similarly, the entry for field 102 for element 76, i.e. the element whose parent is 70 and first child is 77, would have an offset of 47 and a length of 9, since the first occurrence of "BOOK, BODY" occurs at the 47th character in the table and is 9 characters long. Likewise, element 71 ("BOOK, FRONTMATTER") has an offset of 0 and a length of 16. Various other methods of representing a fully-qualified name for the element may be used, such as a list of fully-qualified names retrieved according to their placement in the list. However, the preferred embodiment should reduce the size of this table sufficiently to allow the fully-qualified name table to be loaded into RAM.

Figure 8:
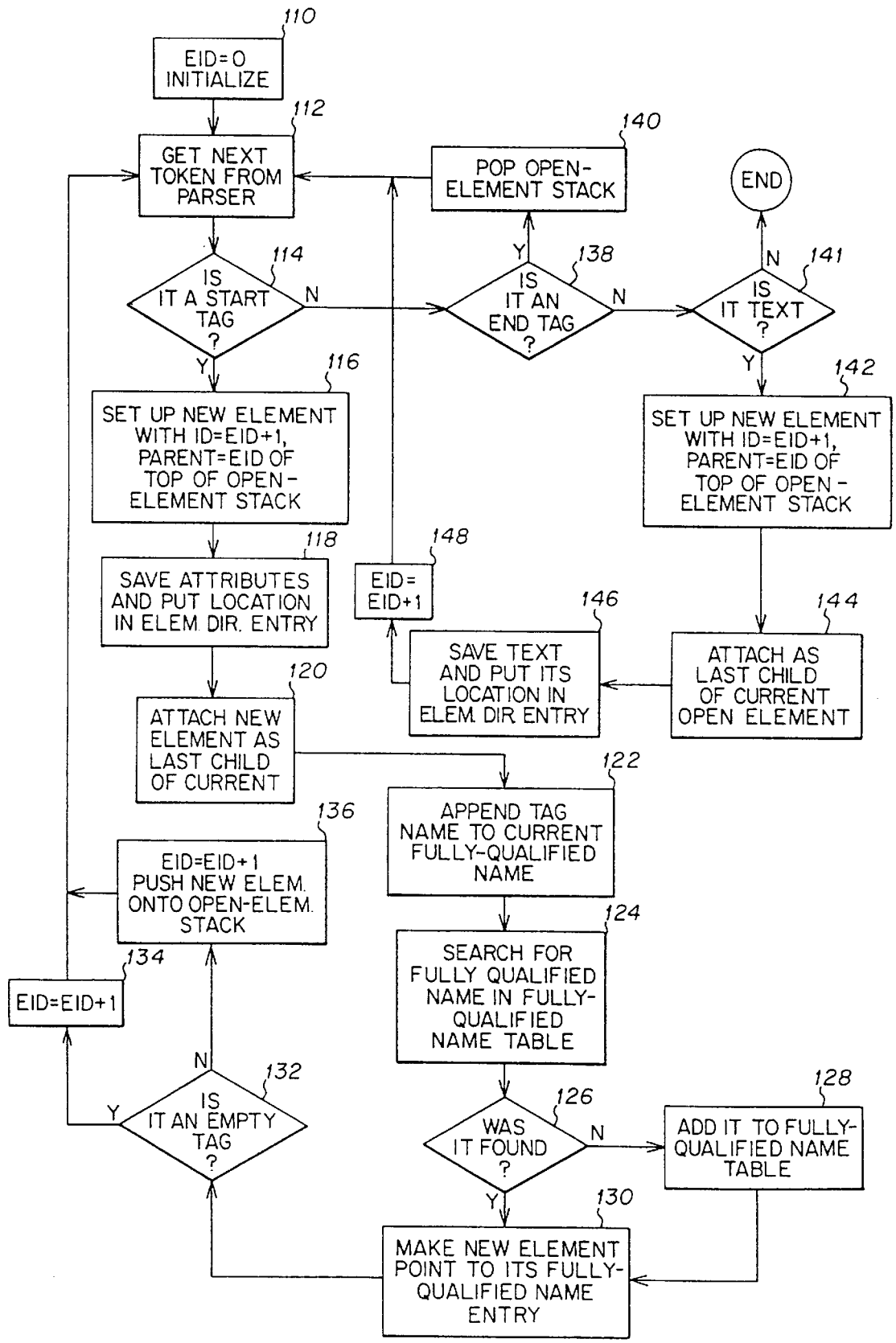
FIG. 8 is a flowchart describing how a document is parsed to construct the element directory and fully-qualified name table.

Referring now to FIG. 8, the process for generating an. element directory, such as exemplified by FIG. 6, and a fully-qualified name table, as exemplified by FIG. 7, for a document having descriptive markup, will now be described.

The process of indexing a document, i.e. generating the element directory and other data structures, begins with Step 110 of initialization. In Step 110 of initialization, a variable, e.g. "EID", is set to provide an initial element identifier. In the preferred embodiment, this variable is set to 0. A stack, called the open-element stack, is created and is initially empty or supplied with a default element, e.g. "#ROOT", for the first element identifier. The qualified name for the current element is also held in this stack and is initially empty or "#ROOT". Three file objects are also created, in the step 110 of initialization, on the mass storage device 34. These file objects are called the element directory, the fully-qualified name table and the text content. The element directory, fully-qualified name table and text content of a document are written to these file objects, respectively, during the indexing process. Creating these file objects and writing to them are normally handled by instructions to the operating system of the data processing system 30, to open a file and write to it.

After the Step 110 of initialization, Step 112 of retrieving a token from a parser is performed next. A suitable parser processes the provided electronic document and, for each markup tag for an element including-start and end tags and for each text chunk, returns a token indicating the type of tag and its location in the document. Markup tags include start tags, corresponding end tags, and text chunks. There also may be tags representing empty elements, which are essentially combined start and end tags as described above in connection with FIG. 5. In the preferred embodiment, for documents in SGML, parsing is simplified if the provided document is in normalized, or "minimal", form. This form of an SGML document is defined by the standard mentioned above in section 15.1.2 thereof. Parsers and normalizers for SGML are well known. For example, the XGMLT™ Engine and the XGML™ Normalizer, both available from Exoterica Corporation of Ottawa, Ontario, Canada may be used for validating, parsing and normalizing SGML documents.

After a token is retrieved from the parser (in Step 112), it is determined in step 114 whether it is a start tag or an empty tag. The parser indicates the type of the token. If the token is a start or empty tag, a new element descriptor 90 (FIG. 6), is established in step 116, in the element directory 91 with an element identifier of "EID" plus 1. The parent field 92 for the new element descriptor 90 is set to the element identifier of the element on the top of the open-element stack. For the first element descriptor 90 established for a document, parent field is '0', or other suitable initial value.

Processing continues with step 118 of saving attributes of the current token in the text file and placing the location in the text file of the attributes into the text location field 104 of the newly established element descriptor 90 for this element in the element directory 91.

Next, in step 120, the new element is established as the last child of the element at the top of the open element stack, which is its parent. That is, the element identifier of the new element is written in the last child field 96 of the element descriptor 90 of its parent. If another element is already listed as the last child of the top-of-stack element, this other element is attached as the left sibling (field 98) of the new element. Likewise, the new element is indicated to be the right sibling (field 100) of the old last child of the top-of-stack element. If no last child is indicated in the parent element descriptor 90, the new element is also indicated to be the first child (field 94) of the parent (top-of-stack) element. Also, as part of step 120, the element at the top of the open element stack, i.e. the parent element, is indicated to be the parent (field 92) of the new element. The first and last child fields 94 and 96 of the new element descriptor 90 are set to 'NIL' or other non-element identifier value.

After the new element is established in the element directory 91, processing continues with step 122 of appending the tag to the current fully-qualified name, which is retrieved from the open element stack. The current name is attached using a reserved delimiter, e.g. a comma, or other character which is not a character used in any of the descriptive markup tags of a document. The fully-qualified name table (FIG. 7) is then searched (step 124) for the appended name. If the fully-qualified name is not found, as checked in step 126, the new name is added to the fully-qualified name table in step 128. Once it is verified, in steps 126 and 128, that the fully-qualified name for this new element is in the fully-qualified name table (FIG. 7), the pointer field 102 is then set to indicate the offset, or location, in the fully-qualified name table and the length of the name (step 130).

After the new element is established in the element directory 91, and the appropriate entry is made to the fully qualified name table, processing continues with step 132 of determining whether the current tag is an empty tag. Since an empty tag is considered to include an end tag, if the test of step 132 returns true, the variable "EID" is incremented by 1, but this new element is not pushed onto (i.e. stored in) the open element stack (step 134). If the tag is not an empty tag, the element identifier of the new element and its fully-qualified name is pushed onto the open element stack and the variable "EID" is incremented by 1 in step 136. With some parsers, however, an empty tag produces both the start tag and corresponding end tag for the markup element. In this case, steps 132 and 134 may be omitted. Some descriptive markup systems other than SGML may not have "empty" tags, in which case steps 132 and 134 may also be omitted. If the parser does not produce separate start and end tags for an empty tag, steps 132 and 134 are necessary. After step 134 or step 136 of incrementing and pushing, processing continues with step 112, described above, of retrieving the next token from the parser.

Having described the processing of start tags, the processing of end tags and text chunks will now be described.

After step 112 of retrieving the next token, and if the next token is determined not to be a start or empty tag in step 114, processing continues with step 138 of determining whether the next token is an end tag. Since an end tag ends a descriptive markup element in a document, an end tag results in popping (i.e. removing the top element from) the open element stack in step 140 and returning to step 112 of retrieving the next token from the parser.

If the next token is neither a start tag, as determined in step 114, nor an end tag, as determined in step 138, processing continues with the step 141 of determining whether the next token is a text chunk. If the tag is determined not to be text, the token denotes the end of the file and processing concludes. otherwise, processing continues with step 142 of establishing a new element descriptor 90 for the text chunk in the element directory 91, in a manner similar to step 116. In the preferred embodiment, the text chunk is attached as the last child of the element from the top of the open element stack, in a manner similar to step 120 of attaching a new element (step 144). The type name for the text chunk is also stored. The type name may be a reserved name, such as "#TEXT", in place of an offset and length into the fully-qualified name table. Thus, a type name for text elements need not be stored in that table. Optimally, one bit may be used to indicate that the element is or is not a text element. Step 144 also includes the setting of the siblings and parent for the text chunk in the manner similar to step 120 described above. A text chunk normally is defined not to have children elements.

The text of the text chunk is then saved in the open text file and its location in the text file is recorded in location field 104 of the element descriptor 90 for this text chunk (step 146). The variable "EID" is then incremented in step 148 and processing resumes with step 112 of retrieving the next token from parser.

Alternatively, text chunks could be made an integral part of their containing elements. As such a construction may introduce unnecessary complications for complex documents, it is not preferred.

With the procedure as described in the flowchart FIG. 8, a document having descriptive markup, for example the document of FIG. 4, may be parsed and an element directory 91, for example as shown in FIG. 6, be generated. This element directory may then be used to traverse, i.e navigate, the document, since, for each element, the parent element, sibling elements, child elements, and previous elements may be readily accessed in constant time. Such navigation is helpful for combining rendering of the document, full text indexing, generating a table of contents, and creating annotations, bookmarks and history logs. Moreover, since an entry in the element directory may be retrieved in constant time, the element directory and fully-qualified name table may be stored and accessed efficiently on a random-access medium 34 (FIG. 1) such as a disk. Thus, for large documents, the system of the present invention is not limited by the amount of hard RAM in the memory unit 42 of the main computer 32.

Creation of the full text index of the document will now be described in connection with FIGS. 9 and 10. Full text indexers which find and report the number of occurrences of selected words in a document have been known for some time. Such an indexer would determine, for example, that in the sample document of FIG. 4, the word "starting" occurs once, and the word "system" occurs twice. However, such systems normally identify only the total number of occurrences of a word in a document or in a certain level of granularity of a document, such as a paragraph. The system of the present invention, however, reports how many times the word is found in each element and sub-element of all levels of a document. The procedure for obtaining this result is called hierarchical indexing. Two methods are provided for performing hierarchical indexing; both use the data structure illustrated in FIG. 9.

Figure 9:
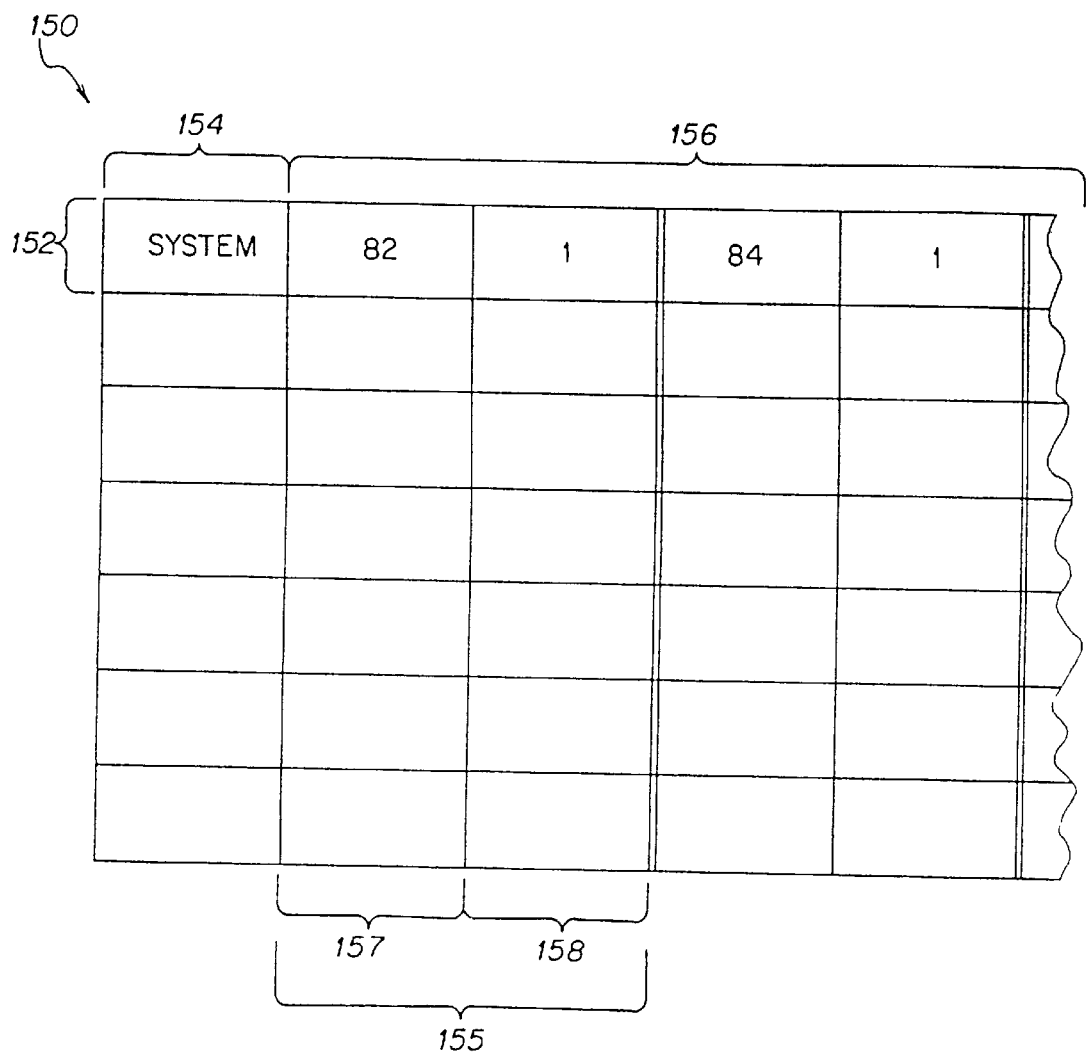
FIG. 9 is an illustration of a frequency record of the present invention for full text indexing.

FIG. 9 illustrates a frequency record table 150 which includes an entry 152 for an indexed word. An entry 152 includes a field 154, which represents the word and records 156 which make an ordered list of pairs of an element identifier (field 157) of the element in which the word (field 154) occurs, and the number of appearances of that word in that element (field 158).

The frequency record 150 is slightly different in initial result for the different methods. With the first method, the resulting frequency record for a word initially includes the number of occurrences of that word for the different leaves of the tree, i.e., the text chunks. When a document is searched for a word by a user, a summation of occurrences of the word in each element of the document performed in the manner described below in connection with FIG. 10. According to the second method, the frequency record for a word includes the number of occurrences of a given word in each element or sub-element of the document rather than only in the leaf elements. This method is normally performed as a user-independent process, before a user views the document. The procedure for this method will be described below in connection with FIG. 11. With both methods, the result visible to the viewer of the document is the same.

The first method of full text indexing will now be described in connection with FIG. 10. This method involves preprocessing the text by a standard full text indexer, along with constructing of the frequency record as shown in FIG. 9 on the basis of the results of such full text indexing. Such an indexer is commercially available as Ful/Text™, from Fulcrum™ Technologies, Inc., of Ottawa, Ontario, Canada. The process of FIG. 10 illustrates how the results of a basic full text index are cumulated. This method is normally used for small documents, as it involves a significant amount of tree traversal while a user is using the system and viewing the document. This method may take an objectionably long amount of time for common words with extremely large documents.

Figure 10:
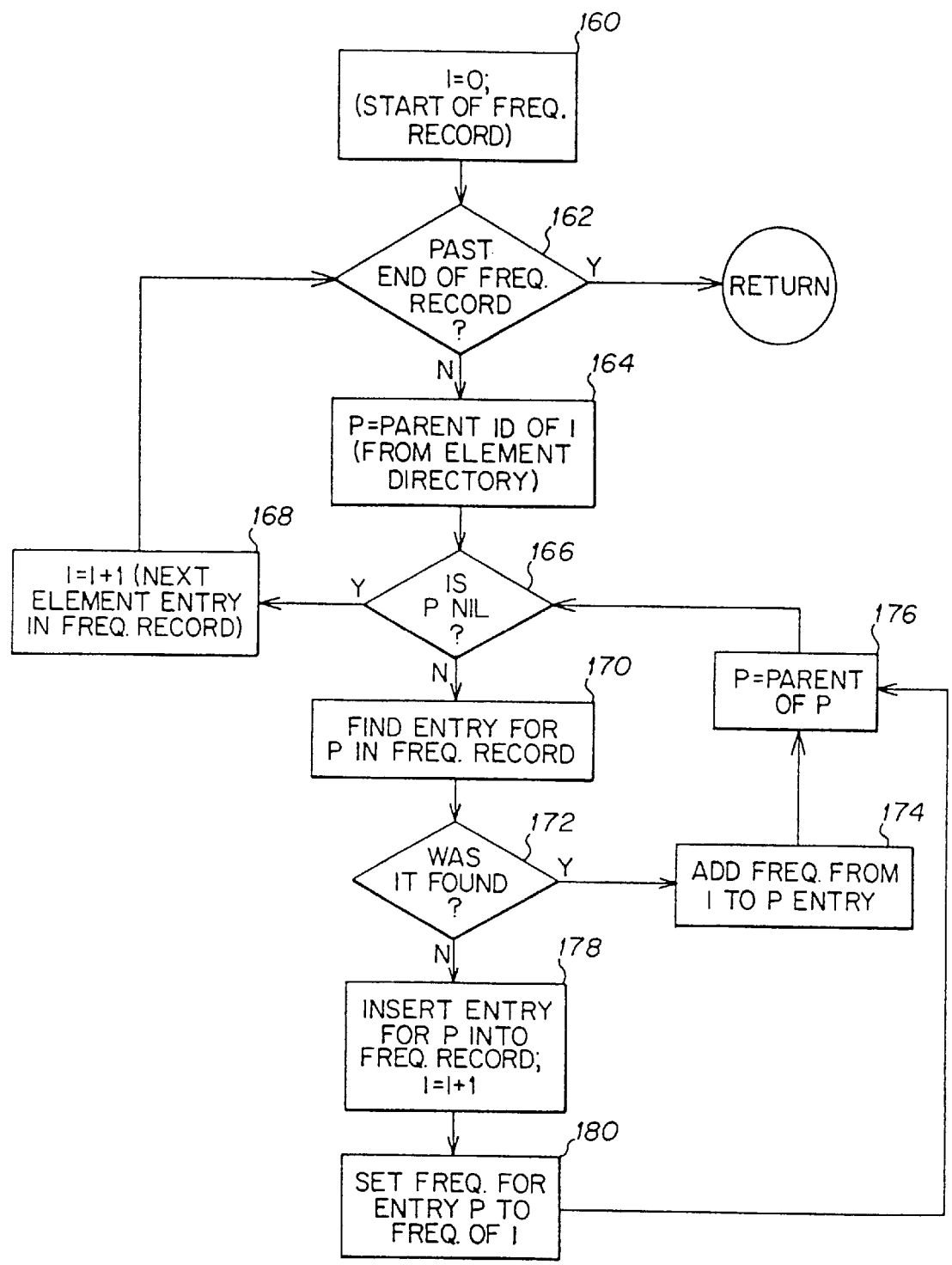
FIG. 10 is a flowchart describing how the frequency record for a word is constructed.

The method of FIG. 10 uses the element directory 91 and the frequency record 152 for a selected word. The first step of this process is the step 160 of initialization which includes setting a variable "I" to 0, or other indication of the beginning of the selected frequency record. Step 162 follows for determining if the end of the frequency record 152 has been reached. When the end of the record for the selected word is reached, cumulation ends. Otherwise, cumulation continues with step 164 of retrieving the element identifier of the parent of the element (to which a variable "P" is set) identified by the first pair 155 of the frequency record 152. If the parent is 'nil', as determined in step 166, the variable "I" is incremented to indicate and to select the next element entry in the frequency record 152 (step 168). Processing continues with step 162 of checking the end of the frequency record as described above.

If the parent is not 'nil', as determined in step 166, the frequency record 152 is searched for an entry for the retrieved parent "P" in step 170. The search is preferably performed using a search which is optimized for ordered lists. If the entry was found, as determined in step 172, the number of occurrences from the "I"th record is added to the number of occurrences for the parent entry (step 174). The variable "P" is then set to be the parent element of the element previously indicated by the variable "P" (step 176). Processing then continues with step 166 of determining if the parent "P" is 'nil'.

If, in step 172, it was determined that the entry for the variable "P" was not found in the frequency record, the appropriate entry 155 for the element identified by "P" is inserted into the frequency record 152 (step 178). This insertion involves insuring that the frequency record is an ordered list sorted by element identifier. Thus, a parent element appears before its children in the frequency record. Also, children appear in the frequency record in the order that they appear in the tree. These relationships hold except for a system which allows an electronic document to be edited and thus allows changes to the element directory to be made.

Also, in step 178, the variable "I" is incremented by 1 in order to indicate the next element entry in the frequency record. In fact, because another entry 155 was inserted in the record before the currently examined record, the element indicated by the variable "I" after the increment continues to refer to the currently examined element.

Next, the number of occurrences of the selected word, or its frequency (field 158), for element "P" is set in step 180 to be the frequency (field 158) of the selected word for the currently examined element, element "I". Processing then continues with retrieving the parent of the element "P" in step 176.

With the procedure illustrated in FIG. 10, the cumulative frequency record for a selected word is developed responsive to a search request by a user of the system.

Figure 11:
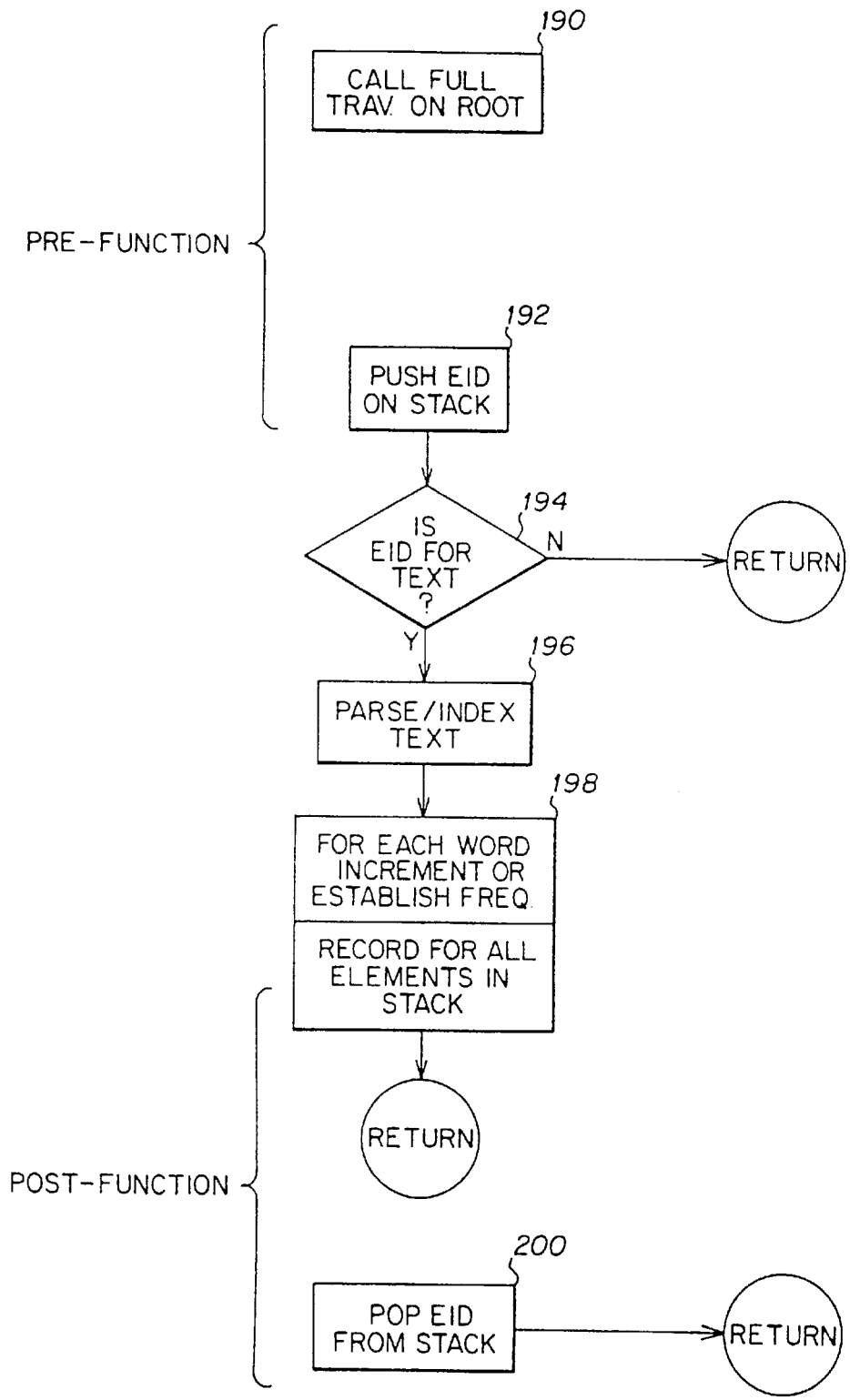
FIG. 11 is a flowchart describing how hierarchical full text indexing is performed for a whole document.

An alternate embodiment for performing a full text index of a document is illustrated in FIG. 11. This method is preferable when adequate space is available on the mass storage device for holding a frequency table 150, such as in FIG. 9, and when a document is especially long. This method is preferably performed before a user of the system reads a document-or performs any searches on it, and is usually performed by the publisher of the document.

The process of full text indexing of FIG. 11 begins with the step 190 of performing a full traverse on the root element, the uppermost element of a tree, of the document. The process of the full traverse is described in more detail below in connection with FIGS. 19A–C. This process is essentially a depth-first search which accepts a pre-function and a postfunction to be performed when an element in the tree is visited. During the depth-first search, the element identifier of a traversed element is placed on a stack by step 192 of the pre-function. If this element identifies text to be indexed, as indicated by field 104, as determined in step 194, the text is parsed or indexed according to standard indexing processes in step 196. For each selected word indexed in step 196, an element 155 of the frequency record 152 is established (if necessary) and incremented in step 198 for each element in the stack. If the current element is determined in step 194 not to be of the type "text", the pre-function ends. Upon completion of a traverse of an element the post-function simply pops the element identifier of the current element from the stack (step 200). The establishment of an element 155 in the frequency record 152 and its incrementing, as performed in step 198, is similar to steps in the alternate method described and illustrated in FIG. 10. In this manner, cumulative frequency records for all or certain selected words in the document are constructed.

According to the present invention, full text indexing may also be applied to the tag names and attributes of the descriptive markup. In this process, the text to be indexed may be retrieved using the text location field 104 for attribute information, and using the fully-qualified name location field 102 for markup tag information. Markup elements may be distinguished from text chunks by examination of the fully-qualified name location field as well, as this field is 'nil' or is a reserved type name such as "#TEXT" for text chunks. Also, since the tag name of an element is only part of the fully-qualified name, the tag name may be retrieved by determining the difference between the fully-qualified name of the desired element and the fully-qualified name of its parent element.

By applying full text indexing to descriptive markup, a user may search for occurrences of words within elements of a selected type or even for specific attributes. For example, a user could search for occurrences of a selected word which are only within long quotes in a document. Or, if the document defines, for example, part number types, specific part numbers could be found in a document.

Also, SGML supports unique identifier attributes for markup tags. Such identifier attributes may also be referenced by other markup tags using referencing attributes which include this identifier. Such attributes are often used for cross-references. Thus, by indexing these attributes a user may search for elements in a document which refer to a selected element by such cross-references. Also, a user may search for a particular element.

Rendering of a document will now be described in connection with FIGS. 12–20. Rendering includes processes for selecting a point in the document from which rendering may begin, displaying the document on an output device, and other operations to be performed by a reader of the electronic document.

Figure 12:
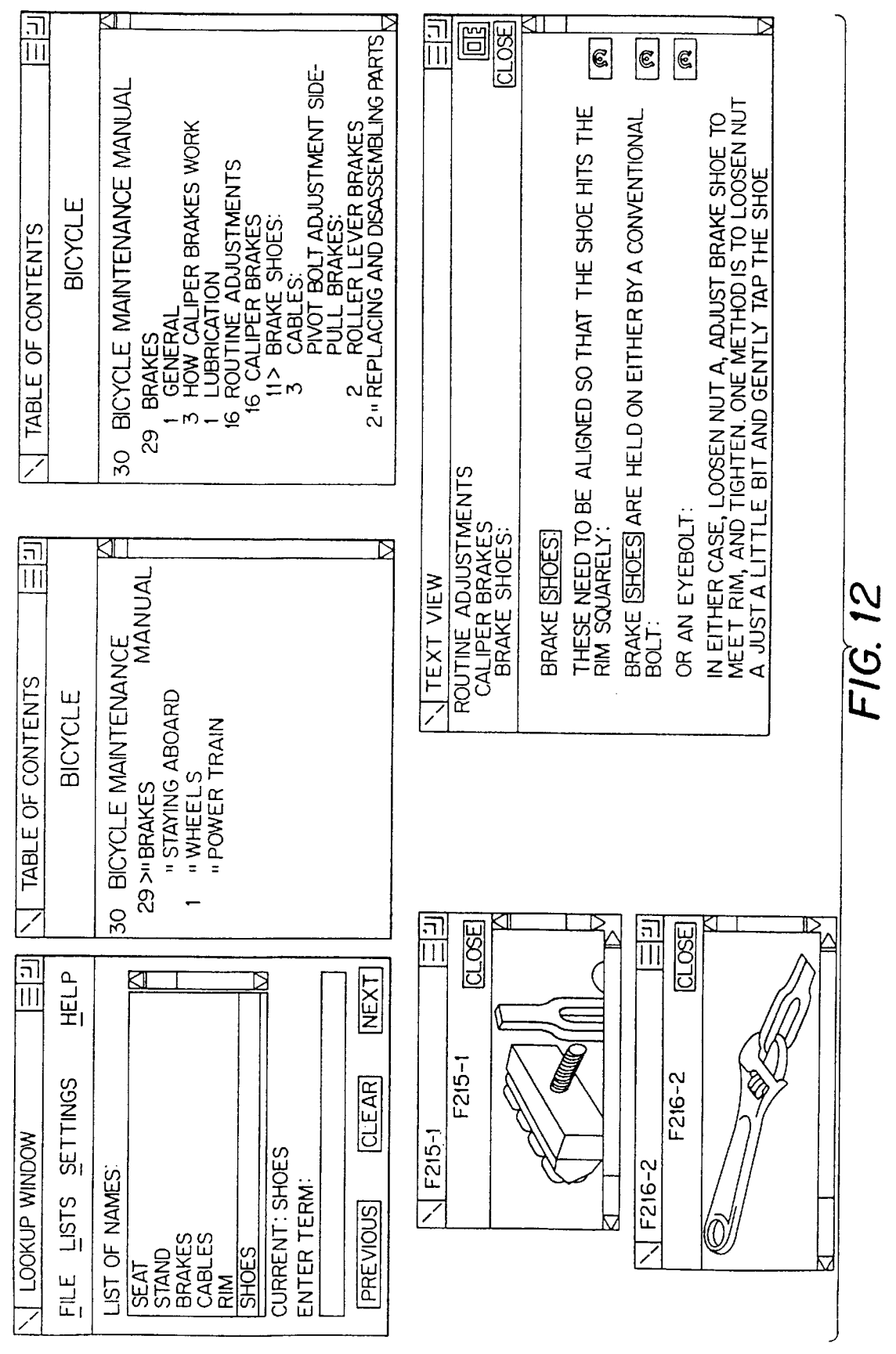
Figure 13:
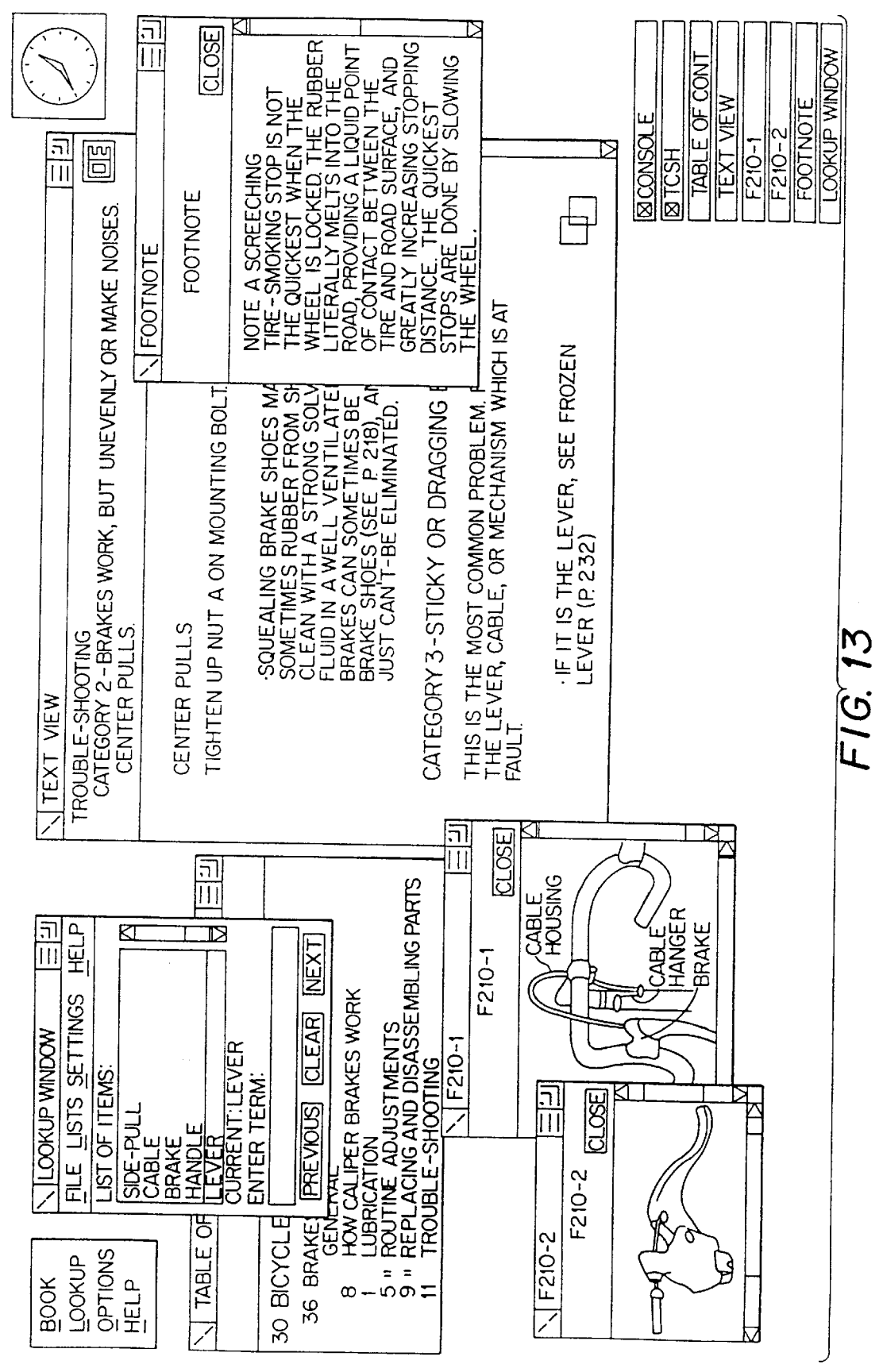

A variety of mechanisms may be used for obtaining from a user a desired starting point from which rendering of a document may begin. One well-known mechanism is a table of contents from which a section of a document may be selected, such as shown in FIG. 12 and FIG. 14. A user may also have a directed path, bookmark, history log or other list of preselected starting points. A user may also perform a search for a word based on the full text index, in known ways of the type as shown in the displays of FIGS. 12–13, to begin rendering at a selected occurrence of a word. Additionally, a document, while being rendered, may cause possible cross-references to be displayed, as shown in FIGS. 13–14. These cross-references may also be used to select a starting point for rendering of the document.

Rendering may also begin by changing the format of the currently displayed document. Such changes are called alternate views. A user may change the window size, thus changing the line length of the displayed document. Text previously shown or hidden may be hidden or displayed depending upon a user's selection or security clearance. A user may also request that portions of a document be printed.

The preferred method for rendering a document, that is, displaying formatted text of a document on an output device, uses an element directory for the selected document, a selected starting point, an indication of the desired format specification for element type in the document and a specification of an output device, such as a "window" on a graphic display or a printer. Format specifications are also known as style sheets. A sample style sheet illustrating typical content is shown in FIG. 15. Such style sheets are well known in the art of electronic publishing and are normally used for compiling and formatting a document to make it ready for printing. Such style sheets normally include an indication of the font type, size, slant, weight, coloring, indentation, line spacing, justification, and spacing for markup elements. A broad range of possible formatting properties is described in ISO/IEC DIS 10179. With the present invention, it is also possible for an element to inherit formatting properties from its parent element.

More detail concerning how a user may use the system of the present invention to read electronic documents is provided in the attached Appendices C and D. Appendix C is manual entitled "Dynatext System Tutorial Release 1.0". This document should also not be printed.

Preferably a style sheet is also provided for the table of contents. In the preferred embodiment, this style sheet is used both for the construction of the table of contents and its display. The preferred style sheet for the table of contents includes, as part of the format for a type of element, the relative location of title text, for that type of element. The relative location indicates the type of the sub-element in which the text of the title occurs. Subsequently, each item having a title may be displayed as part of a table of contents.

Figure 16:
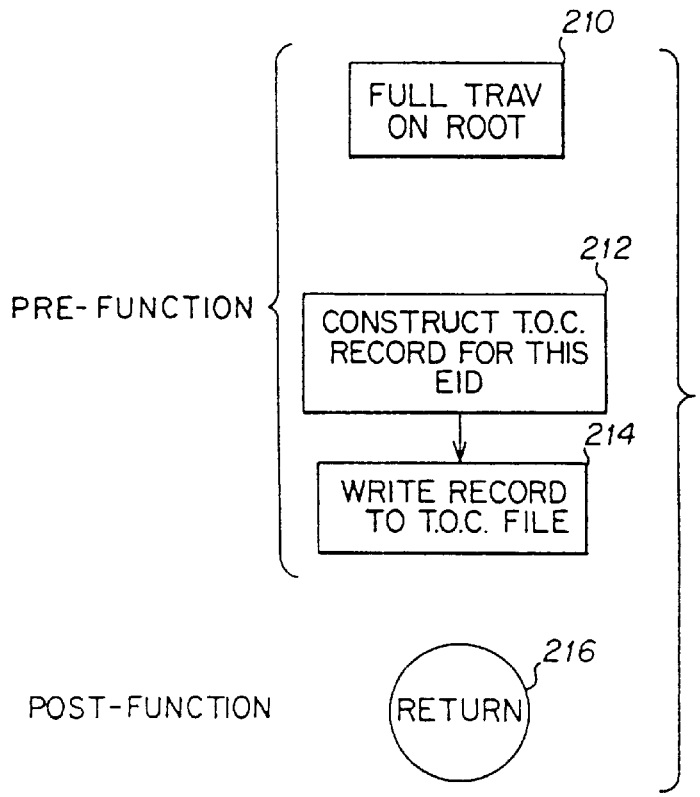
FIG. 16 is a flowchart describing how the table of contents for a document is constructed.

The construction of the table of contents will now be described in connection with the flowchart of FIG. 16. The first step of this construction is step 210 of traversing the document beginning with the root element. This traversal is essentially a depth-first search, which will be described in more detail below in connection with FIGS. 19A–C, and is similar to the traversal described in step 190 of FIG. 11.

The pre-function performed for an element during the traversal of the document tree comprises the steps 212 of constructing the table of contents record for this element, and step 214 of writing the table of contents record for the element to the table of contents file.

The table of contents record for an element preferably includes an indication of its element identifier, its type (optional), and the element identifier of the next element in the document of the same or higher level. The next element may be obtained from the right sibling field 100 of the current element descriptor 90, or of the current element's parent, or higher parent elements, etc. For example, the record for the last section of a chapter in a book may point to the next chapter element of that book. The record for the last element of this last section also points to the next chapter. After the traversal of the current element is complete, the post-function is return step 216.

When the table of contents construction is completed, the constructed table of contents records are written to a file in the mass storage device, preferably ordered according to element identifier. With this table of contents construction, an element having a title may be displayed in the table of contents.

The above-described construction of a table of contents is also a form of excerpted view. Similar excerpted views may also be made, for example, for tables of figures or references found in a document. By providing a style sheet for a desired excerpted view, a record similar to the table of contents record may be constructed. These excerpted views may then be displayed effectively in real time, as the rendering process is enabled to access the selected elements without searching through the whole document.

When the table of contents is displayed on the screen, as in FIGS. 12–14, the title for the first element in the table of contents file is displayed. A section of the table of contents may then be expanded, for example, responsive to a mouse event or other indication by a user, by displaying the titles for any immediate sub-elements of a selected displayed element and for subsequent elements which were in the original display. The rendering of the text for the table of contents may be performed in the same manner as a document. Document rendering will be described in more detail below.

Rendering of a document and the table of contents along with associated graphics and other information results in views, for example, as illustrated in FIGS. 12–14.

These display features provided for electronic documents will now be described in connection with FIGS. 12–14. As illustrated in FIG. 14, different views of the same document may be produced having different fonts, margins and other format specifications without reformatting or otherwise modifying the electronic representation of the document. A user may simply select different style sheets for different views. The process of rendering includes formatting the document while it is being displayed, i.e. "on-the-fly," in the selected formatting style, by applying the style sheet for each element rather than combining it with the document and/or modifying the electronic representation of the document.

Another feature provided by the indexing and rendering methods enables cumulative search statistics to be displayed in combination with the table of contents as shown in FIGS. 12–13. A user may instruct the system to search on a given word in a document. The elements in which the selected word occurs may be determined from the frequency record for the selected word. By providing a style sheet for the table of contents which directs the rendering process to examine a selected variable, e.g. "word", which may store a value indicative of a selected search word, when a table of contents then is displayed, the number of occurrences in the element corresponding to the item for the selected word may be retrieved from its frequency record and displayed. Thus, a user may know how many times a word occurs in each section of a document whose table of contents item is displayed. A user may then determine relevant portions of the displayed document.

The process of displaying and formatting a document will now be described in connection with the flowcharts of FIGS. 17–25. This process, in contrast to previous systems which compile a document and format information into one document, which is then used for display purposes, renders a document without modifying the document or its internal representation. The text which is displayed, or sent to an output device, is not pre-formatted, but rather is formatted "on-the-fly". Moreover, formatting is not considered as a sequence of commands but as properties which are applied to an element of a document. Thus, all formatting properties which are changed for an element are restored at the end of the processing of that element. Separate instructions are not required for element ends. Thus, no side-effects are created on later elements which are not sub-elements of the displayed element.

The first step in the rendering operation is step 220 of finding an element, i.e. its element identifier from which rendering may begin. Step 220 is used to handle the case where the starting point selected by the user is not at a location in the document at which rendering is preferably started. For example, the selected starting point may occur in the middle of a sentence or paragraph; however, rendering preferably begins with an element that, when displayed, starts at the beginning of a new display line, for aesthetic purposes. Such an element may also be described as starting after a breaking point in the document. Step 220 of finding a starting element is followed by step 221 of initializing a style stack by pushing the style definitions for all parent elements preceding the starting element onto a style stack. This step preferably uses the first end of a double-ended queue which is the style stack. Parent elements are retrieved from the element descriptors of the starting element, its parent element and preceding parent elements. The style definitions are retrieved and evaluated as they are placed on the stack in a manner to be described in more detail below in connection with FIG. 17B.

Step 221 of initializing the style stack is followed by a full traverse, to be described later, from the located starting element (step 222). As mentioned above, the full traverse is a depth-first search, which performs a pre-function before the traversal of an element (i.e. before its children are visited) and a post-function after the traversal (i.e. after its children are visited). The goal of this traversal is to visit each node of the tree representing the document, both before and after visiting its children, starting from a provided node and continuing through thee whole tree (unless it aborts before completing). This traversal may. also be considered as a complete depth-first search of a tree, starting with the root element which omits performing functions on these elements until the starting node is reached.

Figure 17C:
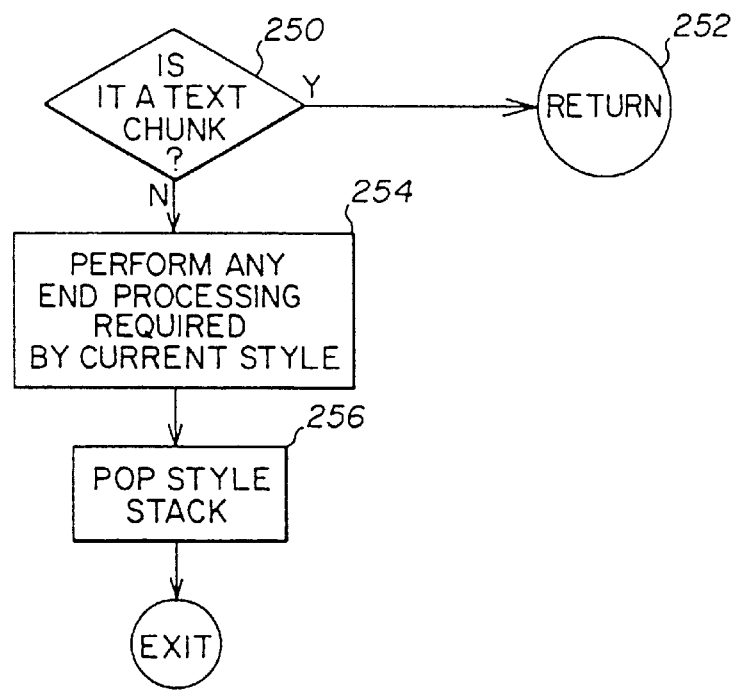
FIG. 17A–C are flowcharts describing how a document is rendered according to the present invention.
Figures 17A, 17B:
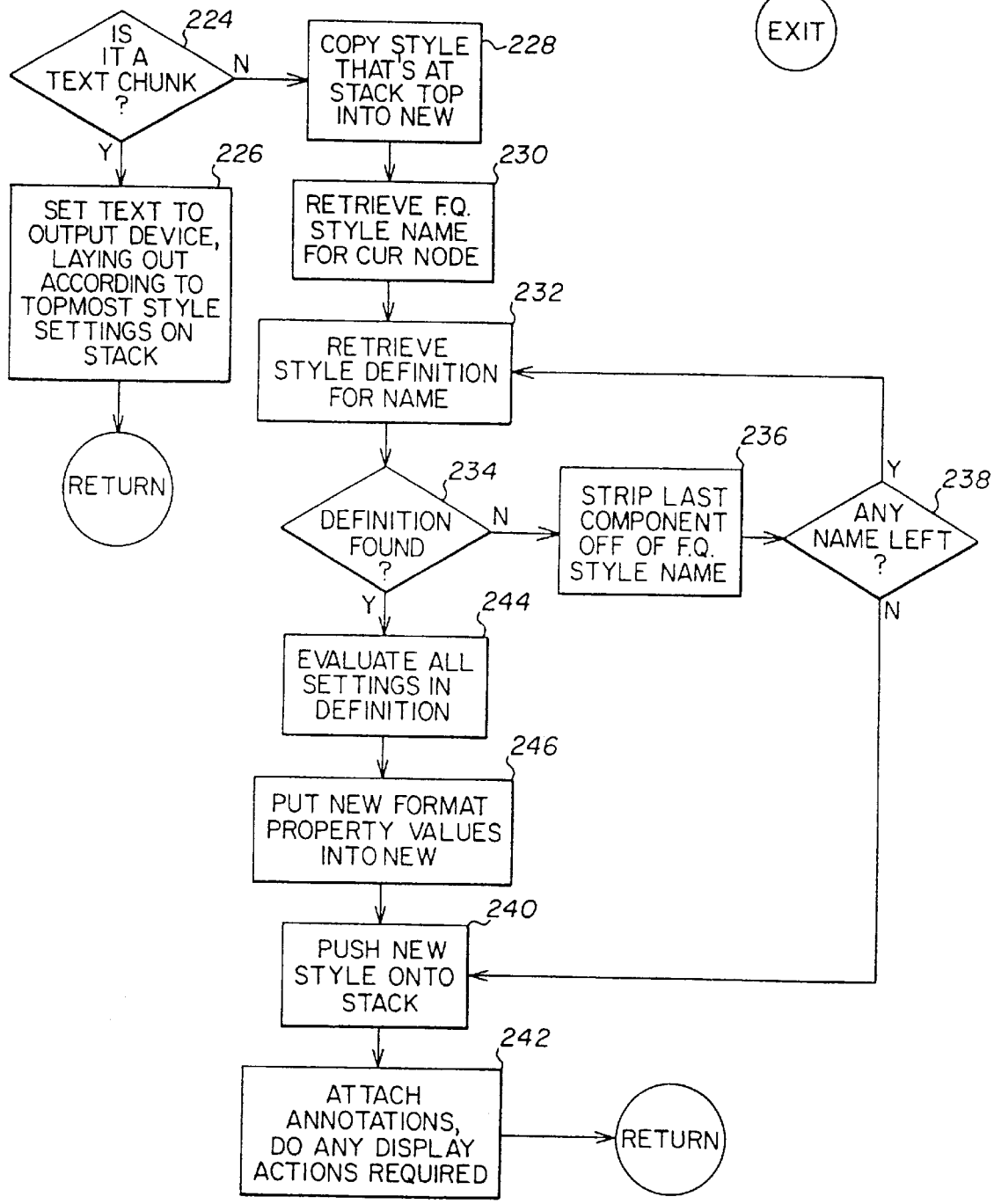

The pre-function, illustrated in FIG. 17B, to be performed on an element during the traversal of step 222, will now be described. The first step of the rendering pre-function is step 224 of determining whether the element is a text chunk. This step may be accomplished by examining the type name field 102 for the current element. If the element is a text chunk, the text is retrieved from the text file and sent to the output device, formatted according to the style settings provided at the top of a style stack (step 226). The style stack is constructed during the traversal of non-text elements described below.

As part of this step of displaying the text, it is preferable to stop displaying text when the end of the window, or viewable display area, is reached. By stopping the display of the text, processing of text which is not viewable may be eliminated. If a user selects the later text, such as by scrolling the window, re-rendering of the document from a starting point after the original starting point normally produces the desired result. It is also possible to save a small amount of pre-rendered text for elements occurring shortly after the end of the window is reached. It is also possible to perform some formatting functions for a small amount of text previous to the displayed text, and save it temporarily.

If an element is not a text chunk, as determined in step 224, the style at the top of the style stack, if any, is copied into a variable, e.g "new", in step 228. The top of the stack is preferably the second end of the double-ended queue. If the stack is empty, the style record is initialized to default values, as defined for the graphic display system being used. The style record includes display and format specifications required by the graphic display used by the data processing system. Extra information provided by the style sheet is ignored for of a style record.

When a current style is copied into the variable, "new", during step 228, processing continues with step 230 of retrieving the fully-qualified style name for the current element from field 102 of the element descriptor 90 for the current element. on the basis of the retrieved fully-qualified style name, the style definition for that name is retrieved from the provided style sheet in step 232. Optionally, previously retrieved and evaluated style definitions may be stored in a cache. Step 232 of retrieving the style definition may search such a cache. However, with markup languages that allow attributes, formatting characteristics which depend on an attribute may not be cached according only to the type name. It is preferable to cache formatting for generic type names and apply the formatting required by the attribute to the type name. If the style definition for that style name is not found, as determined in step 234, the first component is removed from the style name in step, 236. For example, if a. style definition could not be found for "BOOK,FRONTMATTER", then the component "BOOK" is removed from the fully-qualified style name. If a style name remains after step 236, as determined in step 238, processing continues by returning to step 232 of retrieving the style definition for the new, shorter name. If no name remains, as determined in step 238, processing continues by pushing the style represented by the variable, "new", unchanged, onto the style stack. The displayed element will then look like its parent element except for those formatting characteristics which may not be inherited. Any further display actions required by the style, such as for the attachment of annotations, are completed in step 242. The process of attaching annotations (step 242) will be described in further detail below in connection with FIG. 21.

If the definition for a qualified style name is found, as determined in step 234, settings for the style definition are evaluated in step 244. If the style definition was retrieved from the cache, step 244 of evaluating may be omitted. For example, if the style sheet indicates that the left margin is to be increased by 5 spaces, the old value of the left margin is incremented by 5 spaces. Thus, the style definitions are evaluated when applied to an element instance and are not compiled. Expressions in the style sheet which are evaluated may include functions for examining system-status information, such as the identification of the user, values of attributes for the current element, neighboring elements in the tree, or the current state of any formatting property, such as the margins. Evaluated settings are placed into the appropriate location in the style record of the variable, "new", (step 246). When the "new" style for the current element is complete (step 246), it is pushed onto the style stack in 240, as previously described.

In step 244 of evaluating the style definition, inheritance of all or some style properties may also be performed. Inheritance, or combination, of style properties by an element from its parent element is enabled by omitting properties from the, format specification (i.e. style sheet definition) for a type name or by instructing, via the style sheet, that the property be inherited. Some properties may also be defined so that they may not be inherited. In this instance, omitted properties in a format specification are evaluated to default values. Thus, as the parent format specification is the initial value of "new", those settings which are not changed are inherited. Such inheritance is useful, for example, for indicating the font in which a whole book is to be displayed or printed.

According to the preferred embodiment, which uses a windowing system, the right margin is defined not by the line length but by a distance from the right edge of the window. This specification simplifies rendering of a document after a window is re-sized horizontally. Specifying a right, margin also permits line breaks to appear at an aesthetically pleasing location. Most word processors specify a line length and clip off the ends of lines which extend beyond the current window width rather than re-adjusting the text to fit.

The post-function for rendering, performed after the traversal of an element, will now be described in connection with FIG. 17C. The first step of the post-function is step 250 of determining if the current element is a text chunk. If the element is a text chunk, the post-function returns in step 252. Otherwise, processing continues with step 254 of performing end processing required by the current style. Such end processing may include, for example, placing a blank line after a paragraph. End processing is followed by step 256 of popping the style stack. The popped style may also be placed into a cache as described above.

Figure 18A:
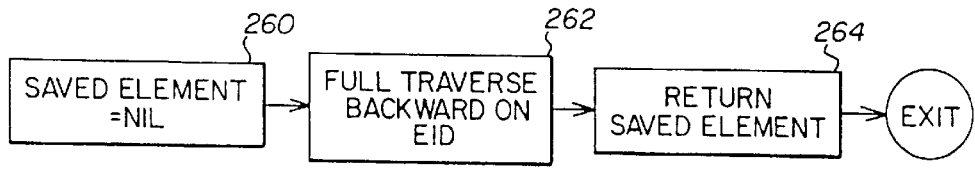
FIGS. 18A–C are flowcharts describing how the starting point for rendering is determined.
Figure 18B:
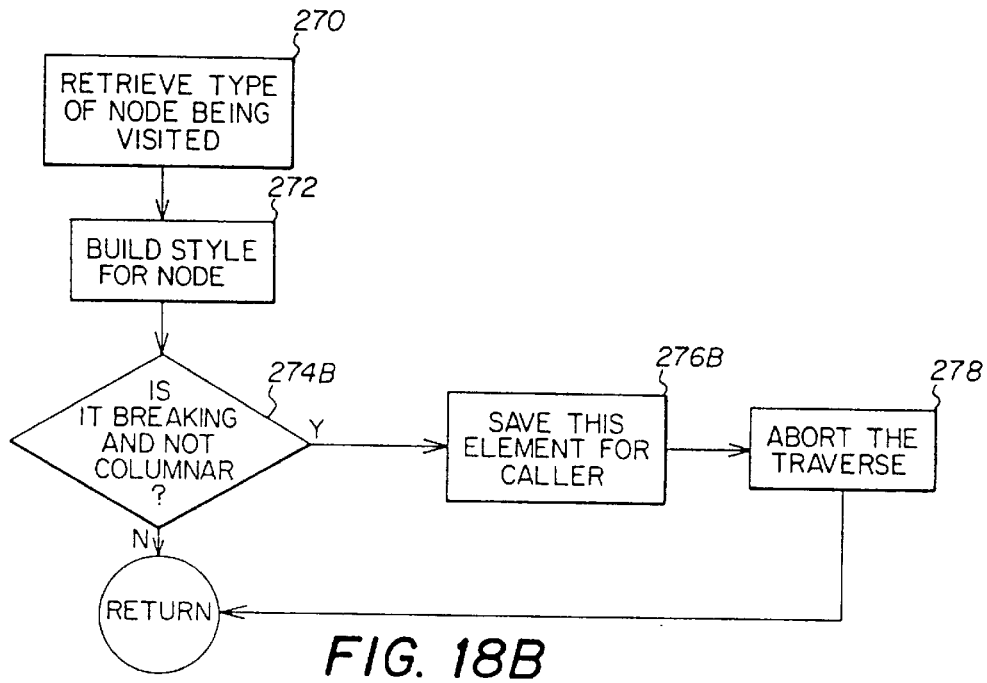
Figure 18C:
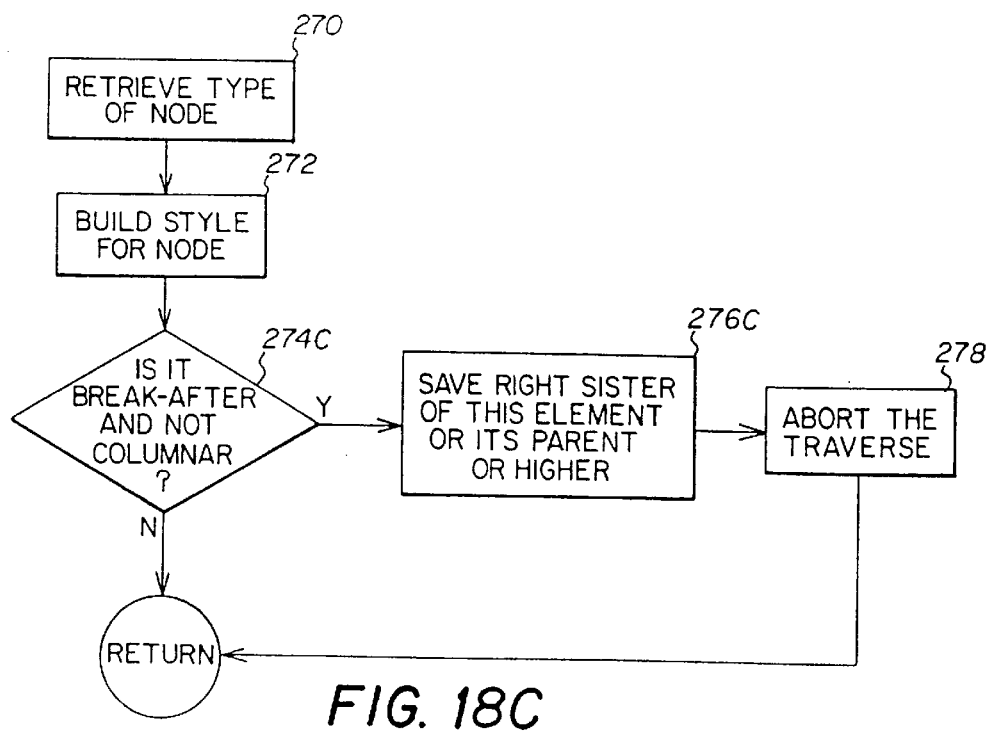

The process of finding a suitable starting point from a provided starting point (step 220, FIG. 17A) will now be described in further detail in connection with FIGS. 18A–C. The first step in finding the starting point is initializing a variable, e,g. "saved element", to a 'nil' value (step 260). Next, the document is traversed backwards from the starting point selected by the user in step 262. This backward traversal procedure is simply the above-described depth-first search performed in reverse. This process is described below in further detail in connection with FIGS. 19A–C. For each. element traversed in step 262, a pre-function, to be described below in connection with FIG. 18B, and a post-function, to be described below in connection with FIG. 18C, is performed. The pre- and post-functions save, as the "saved element", an element, preferably the nearest element, previous to the provided starting point, before which a line break or breaking point occurs and/or from which rendering may preferably begin. An element may cause a break either before or after itself. Thus, an element causing a break before itself becomes the, "saved element". An element causing a break after itself causes the "saved element" to be the element which follows the "break-after" element. When the traverse of step 262 has completed, the "saved element" is returned by step 264 to the rendering procedure. A full traverse is then performed beginning with the "saved element", in step 222 of FIG. 17A, to display the document.

The pre-function and post-function for the backwards traversal for finding the starting point will now be described in connection with FIGS. 18B–C. As the pre- and post-functions are similar, only one need be described. The first step of the pre-function is to retrieve the type of the element which is currently being traversed (step 270). This step 270 of retrieval is performed by retrieving fully-qualified name field 102 of the element identifier 90 (FIG. 6) from the element directory 91. The style for the current element is then constructed in step 272 in a manner similar to the style construction for rendering described above, using the fully-qualified name for the current element and the style sheet for the desired view. It is then determined, in step 274B, whether the current element is a breaking element which is not columnar. That is, if rendering of the current element is specified by the style sheet to start at the beginning of a display line and the element is not an element found within a multi-columnar structure, the current element is saved, in step 276B, as the "saved element". Both of these characteristics may be determined from the style definition for the element. The traversal in progress is then indicated to abort in step 278. If it is determined in step 274B that the current element is not a breaking element or is columnar, the traversal continues. The post-function is similar, except that it determines, in step 274C, whether a break occurs after the currently traversed element rather than before. The "saved element", in step 276C, then becomes the following element of the same or higher level.

The full traversal of the document mentioned above, or the depth-first search, will now be described in connection with FIGS. 19A–B. This traversal uses an element identifier, a pre-function and a post-function, and an indication of whether the content of the current element, i.e. the children and other elements below the current element in the tree, should also be traversed. The content of the current element is normally . traversed, except for the above-described procedure for finding a starting point, which performs a backwards traverse. It should also be evident that FIGS. 19A–B describe a full traverse forward of a document, from a starting point. For a backward traverse the steps of retrieving a "right" sibling retrieve a "left" sibling, those retrieving a "first" sibling retrieve a "last" sibling, those performing the "post" function perform the "pre" function and vice versa. As a pre-function corresponds to the beginning (or start tag) of an element, during a backwards traverse, the pre-function is performed on it after its children are traversed. The post-function is applied similarly to the end of an element.

As stated above, the goal of the traversal process is to visit each element, beginning with a provided element, both before and after visiting its children, and to continue through the document to the document end. The pre-function is performed when a node is first visited and the post-function is performed after its children have been visited.

The first step of traversing the document from a given starting point is a step 280 of determining whether the start element is nil. If the start element is nil, the traversal ends.

Otherwise, processing continues with step 282 of testing whether an abort flag is set. An abort flag may have been set by the pre- or post-function of finding the starting point for example. An abort flag signifies that the current traversal process is complete and should be terminated. If the abort flag is not set, processing continues with step 284 of determining whether the content of the traversed element should be traversed as well (step 284). Usually, a traverse visits the content of that element. However, when a suitable starting point for rendering is sought, only breaking points occurring before the provided starting point element selected for rendering are relevant. Thus the content of the selected element is ignored. If "include-content" is false, the provided post-function is performed on the provided starting point in step 286. The pre-function is performed for a backward traverse. Otherwise, a traversal function is called on the given starting element in step 288. This traversal procedure is described below in further detail in connection with FIG. 20.

Processing continues with step 290 of determining whether the traverse should be aborted as indicated by the results of the post-function of step 286 or the traversal of step 288. If the traversal is to be aborted, it ends; otherwise a variable "cur" is set to be the starting element in step 292, thus initializing that variable. Processing continues with step 294 of setting "cur" to be the right sibling, or left sibling for a backwards traversal, of the current element indicated by "cur". Next, a determination is made during step 296 as to whether the value of "cur" is nil. If the element, "cur", is not nil, a traversal on that element is performed in step 298. This traversal will be described below in further detail in connection with FIG. 20. It is then determined in step 300 whether the traversal is to be aborted, according to the outcome of the traversal in step 298. If a traversal is to be aborted, the traversal ends. Otherwise, processing returns to step 294.

If it is determined through step 296 that the element "cur" is nil, processing continues with step 302, (FIG. 19B) of setting the variable "cur" to the original starting element, and another variable "TEMP" to nil. Processing continues with step 304 of determining if the element "cur" is the root element of the document. If the element is the root, the traversal ends, otherwise, it is determined in step 306 whether the variable "TEMP" is nil. If "TEMP" is nil, the variable "cur" is set to be the parent of the current element "cur" as determined from the field 92 of the element identifier 94 element (step 308). Next, it is determined in step 310 whether the element "cur" is nil. If the element "cur" is nil, the traversal ends, otherwise the provided post-function is performed in step 312 on the element "cur". The pre-function is performed for a backwards traverse.

After the post-function is performed in step 312, it is determined in step 314 whether the post-function has aborted. The traversal ends if the post-function aborts, otherwise the variable "TEMP" is set to be the right sibling of the element "cur" in step 316 and processing continues with step 304. For a backwards traverse, the variable "TEMP" is set to be the left sibling of the element "cur".

Figure 19A:
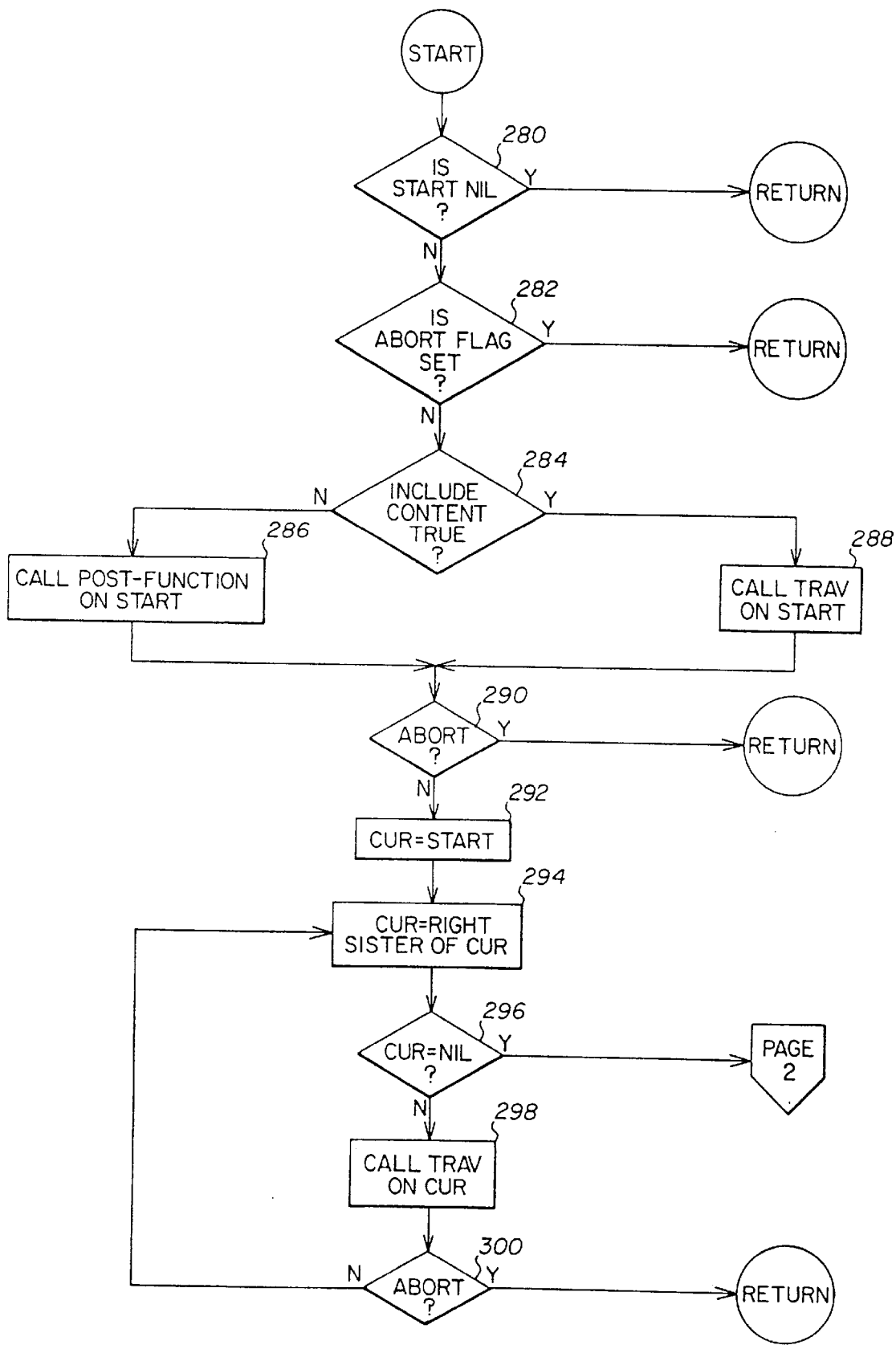
FIGS. 19A–B are flowcharts describing how a depth-first search is performed on a document.
Figure 19B:
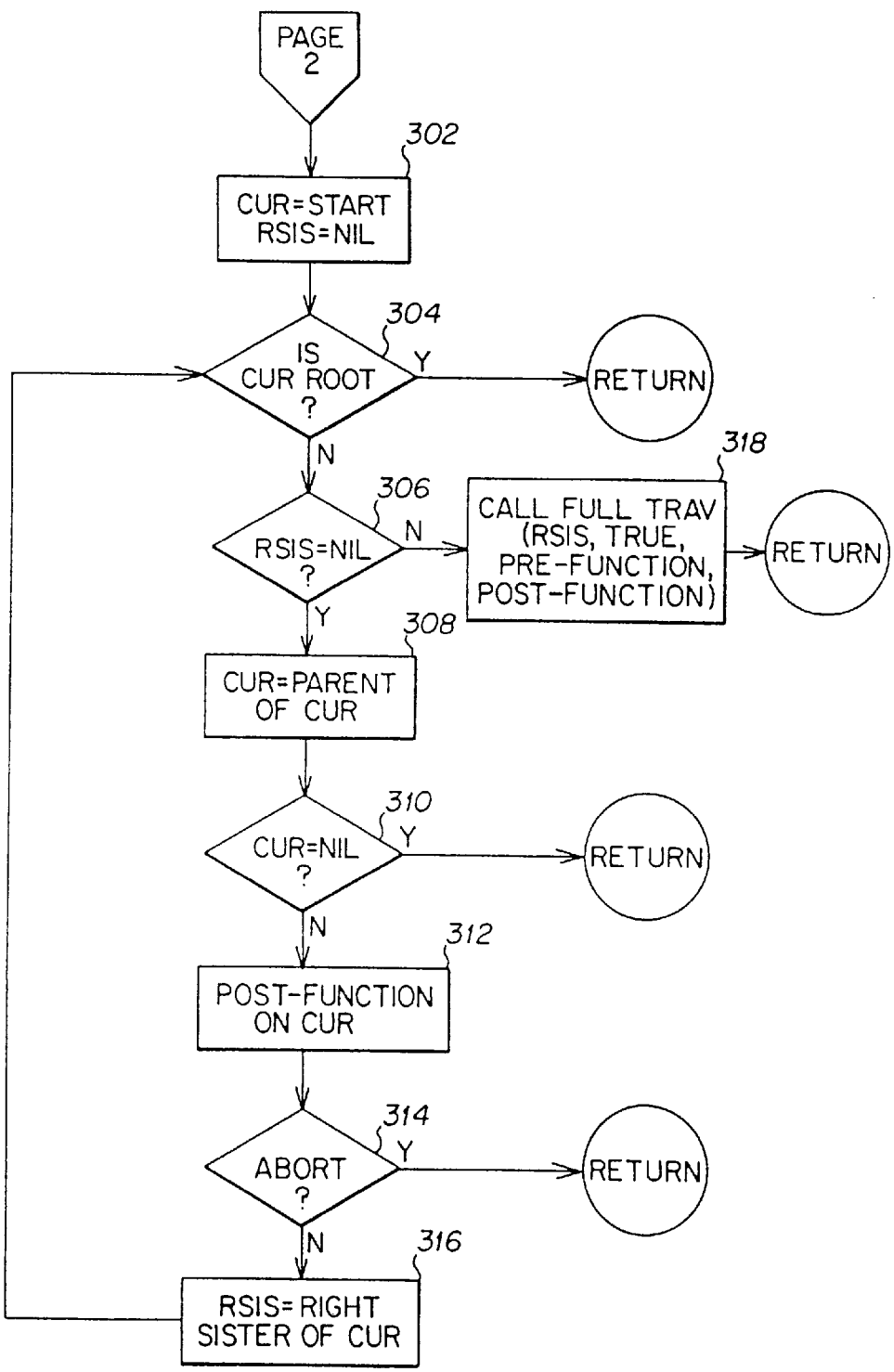

If it was determined previously in step 306 that the variable "TEMP" is nil, the full traversal described in connection with FIGS. 19A and 19B is performed on the element indicated by the variable "RSIS" in step 318.

Figure 20:
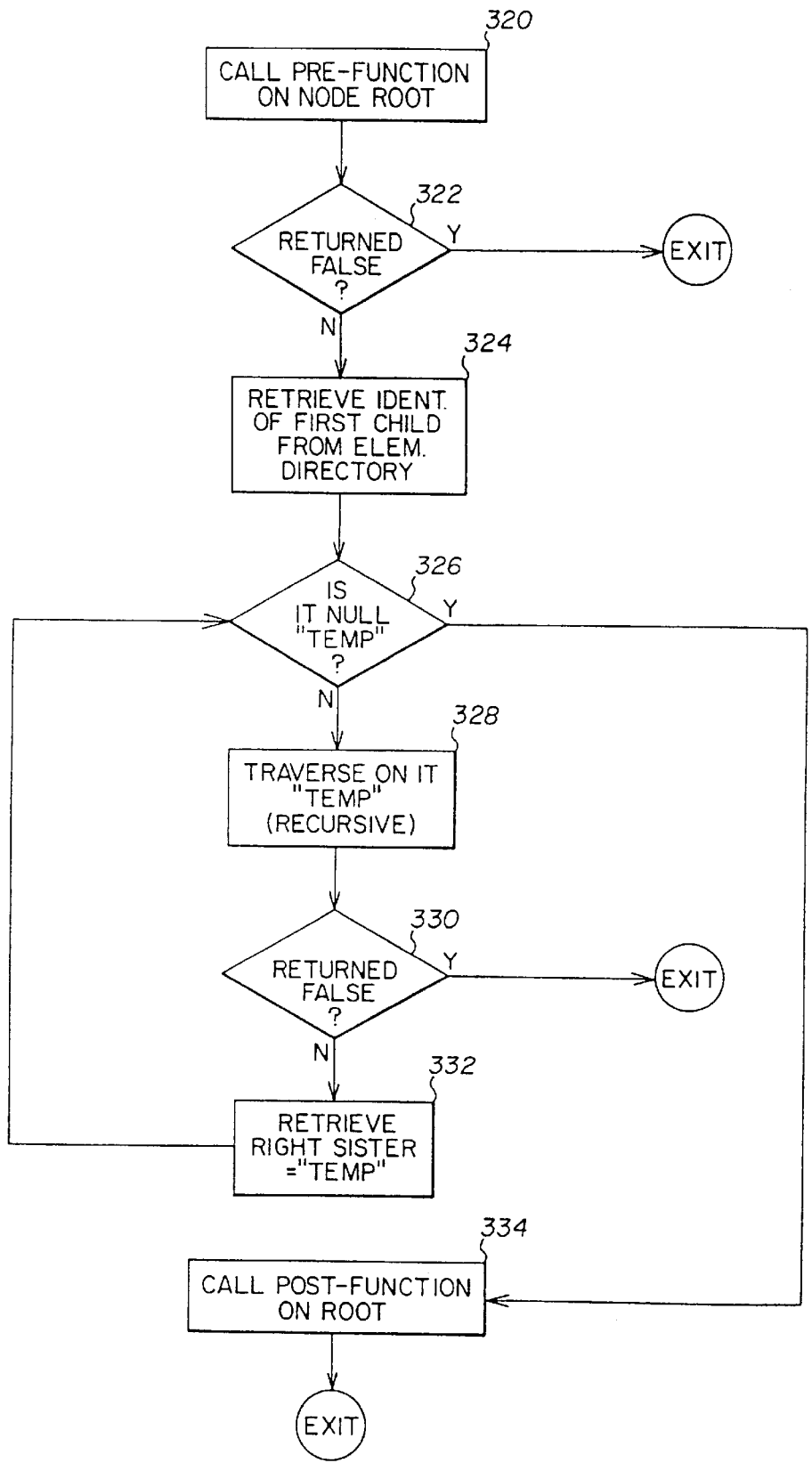
FIG. 20 is a flowchart describing how an element of a document is traversed, or searched.

The partial traversal mentioned above in connection with FIGS. 19A–B will now be described in connection with FIG. 20. Partial traversal begins with step 320 of calling the pre-function on the element indicated by the variable "root" for which the partial traversal is being performed. The post-function is performed for a backward traverse. It is determined in step 322 whether the pre-function has aborted, i.e. returned false. If the traversal is determined not to abort in step 322, processing continues with step 324 of retrieving the element identifier for the first child, or last child for a backwards traversal, from fields 96 or 98 respectively of the element descriptor 90 for the given element (FIG. 5). A variable "temp" is set to this child element identifier. If the child of the element "root" is not null, as determined in step 326, a traversal is performed on it, i.e. variable "temp", in step 328 in a recursive manner. That is, the current traversal is temporarily suspended until the new traversal is completed. When the recursive traversal completes, it is determined in step 330 whether the traversal should be aborted. If the traversal is not to be aborted, processing continues with step 332 of retrieving the right sibling, or left sibling for a backward traverse, of the element "root". From the entry 90 for this element "root", from the element directory (FIG. 5), the variable "temp" is set to the retrieved element identifier. Processing then continues with step 326 as described above. If in step 326 it is determined that "temp" is null, the appropriate post-function is performed on the element "root" in step 334. The pre-function is performed for a backward traverse. The traversal of element "root" is completed with the completion of this post-function.

The traversal described above in connection with FIGS. 19A–C may be optimized in a special case. If the element identifiers for each element within a document are sequential according to the order these elements appear within the document, and a post-function is not required for the desired purpose of the traversal, the full traverse may be performed on the element simply by applying the pre-function to each element in the order defined by their element identifiers. Such an optimization would be useful, for example, in connection with the table of contents construction as described above in connection with FIG. 16.

Figure 21:
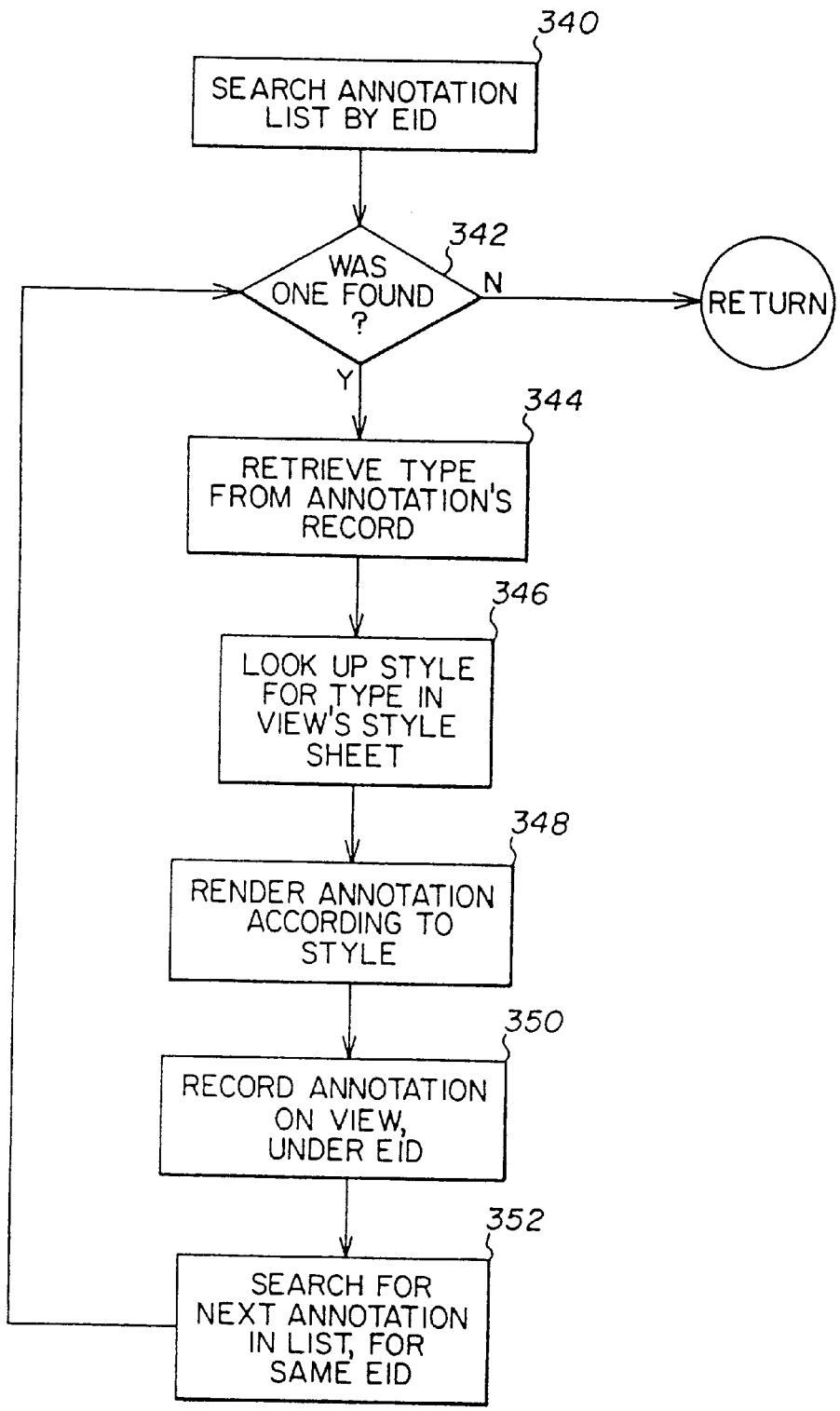
FIG. 21 is a flowchart describing how annotations are rendered according to the present invention.

The attachment of annotations mentioned above in connection with FIG. 17B will now be described in more detail in connection with FIG. 21. Annotations and attributes, such as cross-references, graphic displays, footnotes and other special display features for a document may be rendered on the display terminal in the text or by separate views. For a document, a list of annotations may be provided with an indication of the identifier of the element to which the annotation belongs. The placement of the annotation on the graphic display depends on the style sheet provided for annotations in a given view. For example, a style sheet may indicate that annotations (or only specific types of annotations) should be displayed directly after an element, in an element, at the left margin of the display, centered, at the right margin, or other formatting features. Often, annotations are simply marked on the display by an icon for which separate views may be displayed responsive to a user's selection of such an icon. Some publishers may also choose (via the style sheet) to highlight, underline, or otherwise modify the format of the text in an element that has an annotation.

The first step of attaching an annotation is step 340 of searching the annotation list for the identifier for the element currently being rendered on the graphic display system. If no annotation is found, as determined in step 342, the attachment for annotations in that selected element is complete. Otherwise, processing continues in step 344 for retrieving the type for the annotation from its record in the annotation list. Next, the style for that type of, annotation is found from the style sheet for the current view of the document (step 346). The annotation is then rendered on the screen according to the style found (step 348). Typically, the style indicates that an icon is to be displayed somewhere on the screen near the selected element. Next, information about the annotation is recorded on the view under the element's identifier in step 350. The details of this recording are described in more detail below. Processing continues with step 352 of searching for the next annotation in the list for the currently displayed element, and returning to step 342 as described above. In this manner, annotations for a given element are displayed for that element when that element is rendered.

Recording of the information about the annotation (step 350) may be omitted in other embodiments; however, in the preferred embodiment using "X Windows", this step is preferable. In X Windows, a view of a document, or a "window", has a corresponding data structure, with which those skilled in the art are familiar, which stores information regarding the location on the screen, the size, etc. of the window. When an annotation is attached, relevant information is recorded in an annotation data structure such as a "web", described below. Such relevant information may include the element identifier in which it occurs and a pointer to instructions to be performed when the icon is selected. Other view-independent information may also be recorded. In the view data structure the element identifier and a pointer to the web are stored, along with any other view-dependent information, such as the location of an icon for the annotation.

Figure 22:
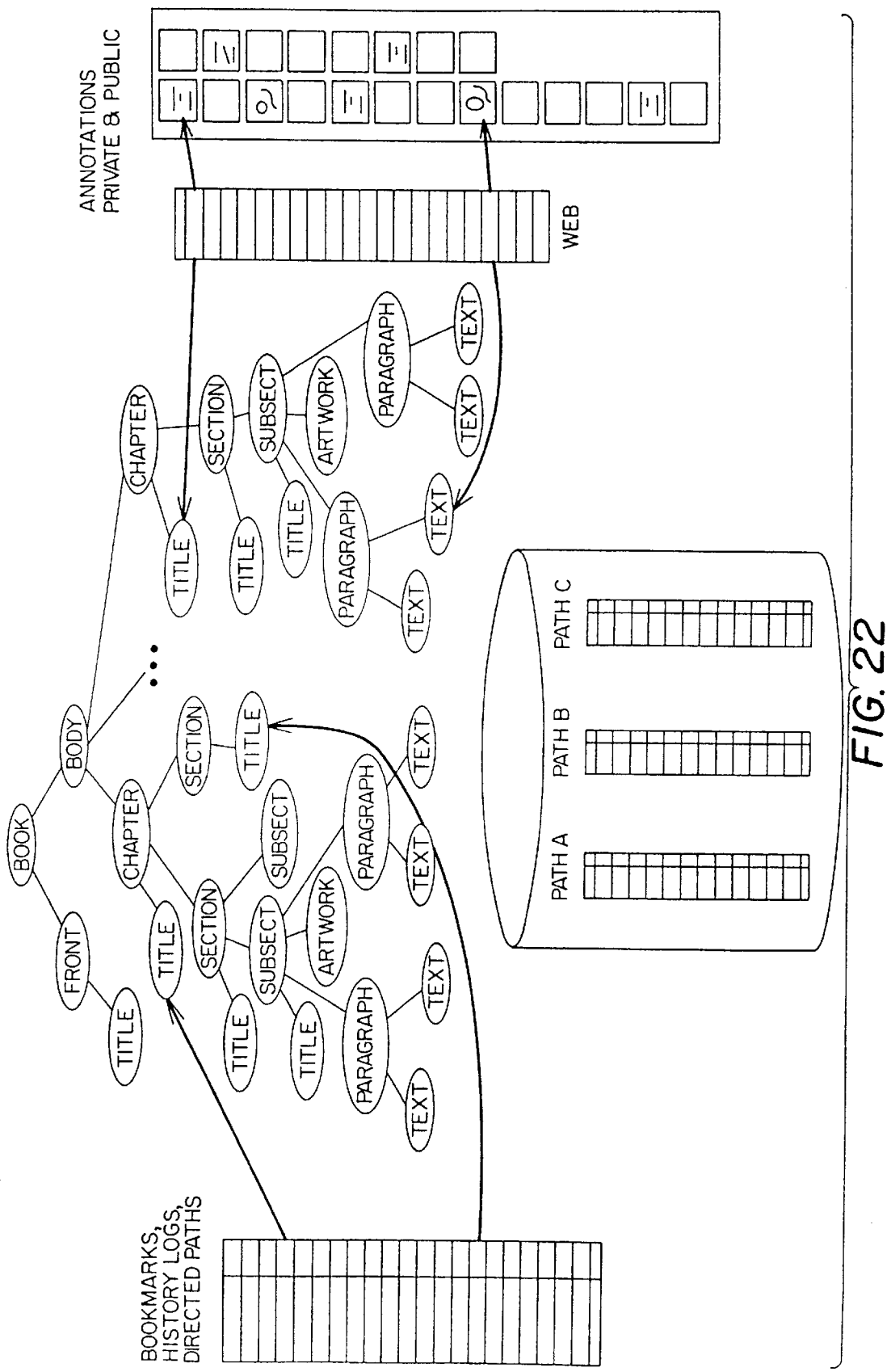
FIG. 22 is a diagrammatic illustration of how annotations, bookmarks, history logs, and directive tasks are attached to a document by the system of the present invention.

A user may also be provided with the capability of making private and public annotations, bookmarks, history logs and directed paths, which are graphically illustrated in FIG. 22 as part of the document structure. Using such structures a reader of an electronic document may attach comments or other information to a document, create paths through a document which other may follow later, and backtrack to previously viewed sections of a document.

Such capability normally needs to be provided without modifying the documents being read because a document may be on a read-only medium, or because a user may not have authority to modify the document, or because different users may be applying modifications to unconnected copies of the document and may wish to share such modifications.

Annotations may be made in a manner well known to hypertext systems, known as a web, a type of annotation list. A web is a possibly indexed list of anchor-sets. Each anchor-set represents a hypertext link between the anchors in the set. Each anchor refers to a location in a document and specifies a name for the data representation used by the document. The location in an anchor-set may be a document name, a markup tag in a document, a graphics file, another computer process, or other representations.

A web may be sorted and/or indexed according to the sequence of creation of anchor-sets or by properties associated either automatically or manually with links in the web. An anchor, anchor-set, or web may also record information such as the time of its creation, the identity of the user creating an annotation, security permissions, keyword and type information, titles and the like.

The web utilized in the present invention may be modified so that it includes the element identifier to which the annotation points rather than a pointer into the document itself. In this manner, the web may be readily searched by the procedure of attaching annotations described above in connection with FIG. 21. Bookmarks, history logs and directed paths are also treated in the same manner as annotations and optionally include information such as titles, date of creation, type and the like and may be formed either by selection from the table of contents or in response to rendering events caused by a user. Such lists may be readily constructed by methods known to those skilled in the art.

In the preferred embodiment, annotations, bookmarks, directed paths and history logs are uniformly treated, thus permitting a user to move information among all of these types of lists. Moreover, a user need only learn how to use one type of interface to use these navigational tools. Furthermore, a portable representation, such as SGML, enables these structures to be shared and to be mailed through networks independent of documents or types of machines. Thus, for example, users of a maintenance manual for a large system could combine annotations, such as for corrections and the like, and submit them to the publisher of the document.

More detail concerning how a user may use the system of the present invention to read electronic documents is provided in the attached Appendices C and D. Appendix C is a manual entitled "Dynatext System Reader Guide Release 1.0". This document should not be printed. Appendix D is a manual entitled "Dynatext System Tutorial Release 1.0". This document should also not be printed.

Having now described a preferred embodiment of the present invention, it would be obvious to those skilled in the art that various changes and modifications may be made therein without departing from the scope of the invention as described by the appended claims.

What is claimed is:

1. A computer program product for constructing a representation of a digital document, the digital document having descriptive markup defining a plurality of hierarchical elements, wherein each element except a root element has an ancestor element and wherein each element has a type name and may have a child element, a left sibling element and a right sibling element, and wherein at least one element contains text content, the computer program product comprising:

a computer readable medium having computer program logic stored thereon, wherein the computer program logic defines:

a parser for providing a sequence of element events in response to detection of elements and text events in response to text content;

means, responsive to an element event, for assigning a unique element identifier to the element event;

means, responsive to an element event, for constructing the type name for the element event from the descriptive markup defining the element event; and means, responsive to an element event, for constructing an element descriptor, addressable by the element identifier assigned to the element event, wherein the element descriptor stores an indication of the type name and any parent element, first child element, last child element, left sibling element, right sibling element, and text content contained within the element.

2. The computer program product of claim 1, wherein the computer program logic further defines:

means for storing the text content of the digital document separate from the digital document and without descriptive markup, and wherein the indication of the text content contained within an element stored in the element descriptor of the element is indicative of the location of the text content in the separate means for storing.

3. The computer program product of claim 1, wherein the indications of any parent, child or sibling elements in the element descriptors are indicative of the element identifiers of the parent, child or sibling elements.

4. The computer program product of claim 1, wherein the means for assigning element identifiers assigns numbers according to a sequence matching the sequence of events provided by the parser.

5. The computer program product of claim 1, wherein the computer program logic further defines:

means for indexing at least the text content of the digital document including means for providing a sequence of word events in response to detection of each word in the text content;

means, responsive to a word event, for constructing a record, addressable by an indication of the detected word, and for storing an indication of the element containing the text content containing the detected word, and for storing an indication of a number of occurrences in the element of the detected word.

6. The computer program product of claim 5, wherein the descriptive markup for an element may include an attribute, and wherein the means for indexing at least the text content further indexes the attribute.

7. The computer program product of claim 1, wherein the computer program logic further defines:

for selected elements, a record for storing the element identifier of the element and the element identifier of a next element in the digital document which is not contained within the element.

8. The computer program product of claim 7, wherein the record for an element includes an indication of the type name of the element.

9. The computer program product of claim 1, wherein the descriptive markup for an element may include an attribute; and wherein the means for constructing an element descriptor stores an indication of the attribute as the indication of any text content contained within the element including the attribute.

10. The computer program product of claim 1, wherein the computer program logic further defines:

means for accessing the element descriptor of an element using the element identifier assigned to the element.

11. A process for generating a digital information product comprising computer data signals defining a representation of a digital document, the digital document having descriptive markup defining a plurality of hierarchical elements, wherein each element except a root element has an ancestor element and wherein each element has type name and may have a child element, a left sibling element, a right sibling element, and wherein at least one element contains text content, the process comprising:

parsing the document to provide a sequence of element events in response to detection of elements and text events in response to detection of text content;

assigning, in response to an element event, a unique element identifier to each element event;

constructing the type name for each element from the descriptive markup defining the element; and generating an element descriptor for each element, addressable by the unique element identifier assigned to the element, wherein the element descriptor stores an indication of any parent element, any first child element, and any left sibling element for the element, and encoding each element descriptor in a computer data signal.

12. The process as set forth in claim 11, wherein the element descriptor for an element includes an indication of the location of the text content, for each element containing text content, and, for each element, the type name of the element.

13. The process as set forth in claim 12, wherein the indication of the parent, child and left sibling elements in each element descriptor is the element identifier of the parent, child and left sibling elements.

14. The process as set forth in claim 13, wherein the assigned unique element identifiers are sequential numbers assigned according to the sequence of events provided by the step of parsing.

15. The process of claim 11, further comprising the step of:

accessing the element descriptor of an element using the element identifier assigned to the element.

16. The process of claim 11, further comprising the steps of:

indexing at least the text content of the document to provide a sequence of word events in response to detection of a word in the text content;

constructing, in response to a word event, a record, addressable by an indication of the detected word, for storing an indication of the element containing the text content containing the detected word, and for storing an indication of the number of occurrences of the detected word in the element.

17. The process of claim 16, wherein the descriptive markup for an element may include an attribute, and wherein the step of for indexing at least the text content further includes indexing the attribute.

18. The process of claim 11, further comprising the step of:

for each element, storing in a record the element identifier of the element and the element identifier of any next element in the digital document which is not contained within the element.

19. The process of claim 18, wherein the record for an element includes an indication of the type name of the element.

20. The process of claim 11, wherein the descriptive markup for an element may include an attribute; and wherein the step of constructing an element descriptor includes storing an indication of the attribute as the indication of any text content of the element containing the attribute.

21. A process for constructing a digital information product comprising computer data signals defining a representation of a digital document, the digital document having descriptive markup defining a plurality of hierarchical elements, wherein each element except a root element has an ancestor element and wherein each element has a type name and may have a child element, a left sibling element and a right sibling element, and wherein at least one element contains text content, the process comprising:

parsing the digital document to provide a sequence of element events in response to detection of elements and text events in response to detection of text content;

assigning a unique element identifier to each element;

constructing the type name for each element from the descriptive markup defining the element; and constructing, for each element, an element descriptor addressable by the element identifier assigned to the element, wherein the element descriptor stores an indication of the type name and any parent element, first child element, last child element, left sibling element, right sibling element, and text content contained within the element, and encoding each element descriptor in a computer data signal.

22. The process of claim 21 further comprising the step of storing the text content of the digital document separate from the digital document and without descriptive markup, and wherein the indication of the text content contained within an element stored in the element descriptor of the element is indicative of the location of the text content contained within the element in the separately stored text content.

23. The process of claim 21 wherein the indications of any parent, child or sibling elements in the element descriptors are indicative of the element identifiers of the parent, child or sibling elements.

24. The process of claim 21 wherein the step of assigning element identifiers includes assigning sequential numbers according to the sequence of events provided by the step of parsing.

25. The process of claim 21 further comprising the steps of:

indexing at least the text content of the document to provide a sequence of word events in response to detection of a word in the text content;

constructing, in response to a word event, a record, addressable by an indication of the detected word, for storing an indication of the element containing the text content containing the detected word, and for storing an indication of the number of occurrences of the detected word in the element.

26. The process of claim 25 wherein the descriptive markup for an element may include an attribute, and wherein the step of for indexing at least the text content further includes indexing the attribute.

27. The process of claim 21, further comprising the step of, for each element, storing in a record the element identifier of the element and the element identifier of any next element in the digital document which is not contained within the element.

28. The process of claim 27, wherein the record for an element includes an indication of the type name of the element.

29. The process of claim 21, wherein the descriptive markup for an element may include an attribute; and wherein the step of constructing an element descriptor includes storing an indication of the attribute as the indication of any text content of the element containing the attribute.

30. The process of claim 21, further comprising the step of:

accessing the element descriptor of an element using the element identifier assigned to the element.

* * * * *